United States Patent
Kojima et al.

(10) Patent No.: US 6,628,713 B1
(45) Date of Patent: Sep. 30, 2003

(54) METHOD AND DEVICE FOR DATA ENCODING AND METHOD FOR DATA TRANSMISSION

(75) Inventors: Takashi Kojima, Tokyo (JP); Hideki Koyanagi, Kanagawa (JP); Shigeto Funado, Tokyo (JP); Yoshihiro Murakami, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/292,650

(22) Filed: Apr. 15, 1999

(30) Foreign Application Priority Data

Apr. 30, 1998 (JP) .......................................... P10-121532

(51) Int. Cl.[7] .............................. H04B 1/66; H04N 9/64; G06K 9/46
(52) U.S. Cl. .................... 375/240.16; 382/236; 348/699
(58) Field of Search ................................ 348/699, 700, 348/402.1, 407.1, 409.1, 412.1, 414.1, 415.1, 416.1; 375/240.16, 240.27, 240.01, 240.24, 240.22, 240.15; 382/236, 218, 107, 268, 239; H04B 1/66

(56) References Cited

U.S. PATENT DOCUMENTS

| | | | | |
|---|---|---|---|---|
| 4,951,140 A | * | 8/1990 | Ueno et al. .............. | 348/413.1 |
| 5,732,146 A | * | 3/1998 | Yamada et al. ............. | 348/700 |
| 5,737,022 A | * | 4/1998 | Yamaguchi et al. ......... | 348/699 |
| 5,748,248 A | * | 5/1998 | Parke ..................... | 375/240.15 |
| 6,064,436 A | * | 5/2000 | Okada .................... | 375/240.16 |
| 6,246,799 B1 | * | 6/2001 | Ebisawa .................. | 382/243 |
| 6,330,344 B1 | * | 12/2001 | Kondo et al. .............. | 382/107 |

* cited by examiner

Primary Examiner—Gims S. Philippe
(74) Attorney, Agent, or Firm—Sonnenschein, Nath & Rosenthal

(57) ABSTRACT

The present invention generates coded data having always high image quality irrespective of the change amount of a picture. When a difference between two adjacent frames in inputted picture data is calculated as well as a motion vector between the above frames is calculated, and the picture data is encoded based on the difference and the motion vector between the above frames as well as the motion vector is encoded, a scene change in the above picture data is detected based on the difference between the two adjacent frames in the picture data, and the feature quantity of the picture data is calculated. If the above feature quantity exceeds a prescribed threshold value, the number of pixels of the picture data is reduced in a prescribed conversion ratio at the prescribed timing according to the detected scene change. And the picture data and the motion vector are encoded so as to be the amount of generating codes obtained by allotting the amount of signal of the motion vector representing the movement of the picture data reduced based on the picture data reduced in pixel, to the amount of signal of the picture data.

12 Claims, 18 Drawing Sheets

METHOD AND DEVICE FOR DATA ENCODING AND METHOD FOR DATA TRANSMISSION

BACKGROUND OF THE INVENTION

1. Field of the Invention

The present invention relates to a device and a method for data encoding and a method for data transmission, and more particularly, is suitably applied to a device and a method for data encoding and a method for data transmission for compressively coding picture data, for example.

2. Description of Related Art

Various compressive coding methods have been provided as methods for recording and transmitting picture data in a reduced amount of information when picture data is recorded in the record media such as a magneto-optical disk and a magnetic tape as digital data or when picture data is transmitted via a specified transmission media. As typical of them, there is a Moving Picture Experts Group Phase 2 (MPGE2) method. Nowadays a digital broadcasting system for compressively coding picture data using that MPEG2 method and broadcasted it via ground waves or satellite waves is begun.

In this compressive coding method by the MPEG2 method, picture data is encoded with defining picture data composed of fifteen frames as one processing unit called group of pictures (GOP). For instance, as shown in FIGS. 1A and 1B, in one GOP (frames F0–F14), there are an intra-picture: intraframe-coded picture (I-picture), a predictive-picture: interframe forward predictively-coded picture (P-picture) and a bidirectionally predictive-picture: bidirectionally predictively-coded picture (B picture).

The I-picture is used to keep the independence of GOP, and the entire picture is coded (intra-coding). The P-picture is predictively coded in the forward direction using an I-picture and a P-picture existing in the temporal past (forward predictive coding). And the B-picture is predictively coded from both directions using an I-picture or a P-picture existing in the temporal past and future (bidirectional predictive coding).

By the way, as shown in FIG. 2, if a scene changes in a series of pictures to be transmitted, pictures are largely different between a scene A and a scene B. So that, even if a frame picture after the scene change is predicted according to a reference picture before the scene change, an extremely large error is included in difference data between the predicted frame picture and the reference picture, and thus, image quality deteriorates. Moreover, if another frame picture is compressively coded using that frame picture deteriorated in quality as a reference picture, image quality further deteriorates.

To prevent such things, as shown in FIG. 3, the GOP 2 of the scene A is ended at the time point of a scene change, and from a scene B after the scene change, an I-picture is inserted and a new GOP 3 is begun. Thereby, predictive coding can be performed without using the frame pictures of the GOP 2 as reference pictures but the I-picture in the GOP 3 after the scene change as a reference picture. Thus, the propagation of the deterioration of image quality can be prevented.

Here, the configuration of a data encoding device for performing scene change detection is shown in FIG. 4. In FIG. 4, the data encoding device 100 supplies picture data D100 to a scene change detection circuit 101 and a delay circuit 103 individually.

The scene change detection circuit 101 calculates the absolute difference sum of brightness, e.g., between two successive frames. For instance, if absolute difference sum of brightness between the P-picture of a frame F5 and the B-picture of the frame F6 in the GOP 2 exceeds a prescribed threshold value, the scene change detection circuit 101 judges that a scene is changed from the scene A to the scene B, and transmits scene change information data D101 to a picture type decision circuit 102 at this time.

To prevent the propagation of the deterioration of image quality to be caused by predictively coding a frame picture after the scene change using the frame picture before the scene change as a reference frame, the picture type decision circuit 102 specifies its picture type (for instance, the I-picture in the GOP 3 in FIG. 5 is to be a reference frame) when a frame picture after the scene change is encoded, and transmits specifying data D102 to a data encoding device 50.

On the other hand, the picture data D100 inputted to the delay circuit 103 is delayed for a time when the scene change detection circuit 101 and the picture type decision circuit 102 are performing the processing. The picture data D100 is supplied to the data encoding device 50 synchronizing with the timing that the specifying data D102 is supplied.

Here, the data encoding device 50 inputs the picture data D100 to a pre-filter 51 as shown in FIG. 6. The pre-filter 51 applies band limitation on the picture data D100 according to a frequency characteristic control signal S55 supplied from a quantization rate control part 55, and reducing the high frequency component of the above picture data D100, and transmits it to pixel conversion part 52 as band-limited picture data D51.

The pixel conversion part 52 applies pixel conversion processing on band-limited picture data D51. That is, assuming a number of pixels in the horizontal direction of the picture data D100 as horizontal pixel M and a number of pixels in the vertical direction of that as vertical pixel N, the pixel conversion part 52 reduces the horizontal pixel M and the vertical pixel N of the band-limited picture data D51 that has been obtained by band-limiting the above picture data D100 into horizontal pixel m and vertical pixel n that satisfy the relation of m<M and n<N, and transmits them to an encoding part 53 as pixel-converted picture data D52.

Here, the horizontal pixel m and the vertical pixel n are set according to the image contents of the picture data D100, in large values in image contents requiring being high image quality, and in small values in image .contents not requiring.

The encoding part 53 performs compressive coding to the pixel-converted picture data D52 by applying motion compensation processing, discrete cosine transform (DCT) processing, quantization processing and variable length coding (VLC) processing, and then transmits it to a transmission buffer 54 as variable-length coded data D53. At this time, the encoding part 53 modulates a quantization step size in quantization processing based on a quantization control signal S56 supplied from the quantization rate control part 55.

Moreover, an encoding part control part 57 supplies picture types based on the specifying data D102 supplied from the picture type decision circuit 102, coding timings and a search range of motion vectors in motion compensation processing, to the encoding part 53 as encoding part control information D57. Thereby, the above encoding part 53 sets picture types, encoding timings and a motion vector search range in motion compensation processing according to the above encoding part control information D57.

A code amount to be generated in each frame of the variable-length coded data D53 varies according to the image content of the picture data D100. Therefore, the encoding part 53 controls a quantization step size in the quantization processing and band limitation in the pre-filter 51 and accumulates the variable-length coded data D53 for several frames in the transmission buffer 54, and then outputs as fixed-length coded data D50 in which a code amount generated per GOP has been controlled in fixed amount for a fixed period.

That is, the quantization rate control part 55 always monitors the accumulation of the variable-length coded data D53 in the transmission buffer 54 and obtaining this accumulation as occupancy rate information S54, and generate a quantization control signal S56 and a frequency characteristic control signal S55 based on the above occupancy rate information S54, and supplies this to the encoding part 53 and the pre-filter 51. In this manner, the encoding part 53 generates the fixed-length coded data D50 in which a code amount to be generated for a fixed period is fixed.

In the above data encoding device 100, as shown in FIG. 7, the GOP 2 is ended at the timing of a scene change, and an I-picture is newly inserted and the GOP 3 is begun. Furthermore, if the moving amount of a picture is large and a difference value with the previous frame picture is larger than a prescribed threshold value in the pixel conversion part 52 of the data encoding device 50, the data encoding device 100 reduces a number of pixels at that timing (pixel switching point).

In the data encoding device 100 as described above, a timing of scene change and a timing for reducing a number of pixels are shifted. Therefore, there is a problem that if the number of pixels of a frame picture with a large moving amount is reduced and the frame size is reduced in a sequence (scene A), a viewer sensitively notices the change of image quality unfortunately since it is in the same scene and has unnatural feeling.

SUMMARY OF THE INVENTION

In view of foregoing, an object of this invention is to provide a device and a method for encoding that can always generate high quality coded data irrespective of a change of picture and a method for transmitting such data.

The foregoing object and other objects of the invention have been achieved by the provision of a device for method and device for data encoding and method for data transmission. In the case where a difference between two adjacent frames in inputted picture data is calculated as well as motion vectors between the above frames and the picture data is encoded according to the above interframe difference and motion vectors as well as the motion vectors, a scene change in the above picture data is detected based on the difference between two adjacent frames in the picture data, a feature amount of the picture data is calculated, and if the above feature amount exceeds a prescribed threshold value, the number of pixels of the picture data is reduced in a prescribed conversion ratio at the prescribed timing based on the detected scene change, and the picture data and the motion vectors are encoded so that their code amount equals the code amount to be generated obtained by allotting the code amount of motion vectors, representing the movement of the picture data, reduced in proportion to said picture data in which the number of pixels has been reduced.

By reducing the number of pixels at the prescribed timing based on the detected scene change, the timing to reduce the number of pixels with the timing of the scene change. Therefore, high-quality coded data in which the deterioration of image quality is prevented can be generated.

In the case where a difference between two adjacent frames in inputted picture data is calculated as well as motion vectors between the above frames the picture data is encoded based on the above interframe difference and motion vectors as well as the motion vectors, a scene change in the above picture data is detected based on the difference between the two adjacent frames in the picture data, first coded data is generated by encoding the picture data and the motion vectors without converting the number of pixels of the picture data, and also second coded data is generated by encoding the picture data and the motion vectors so that their code amount equals the code amount to be generated obtained by allotting the code amount of motion vectors, representing the movement of the picture data, reduced in proportion to the pixel-converted data. The image quality of the first coded data and the image quality of the second coded data are compared. And if the second coded data is selected based on the above comparison result, the above second coded data is outputted at a prescribed timing based on the scene change.

If the above second Coded data is selected since the image quality of the second coded data is better than that of the first coded data, it is outputted at the prescribed timing based on the scene change. Thereby, a timing for outputting the second coded data and a timing of scene change can be associated. Thus, high quality coded data in which the deterioration of image quality is prevented can be generated.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Figure 8:
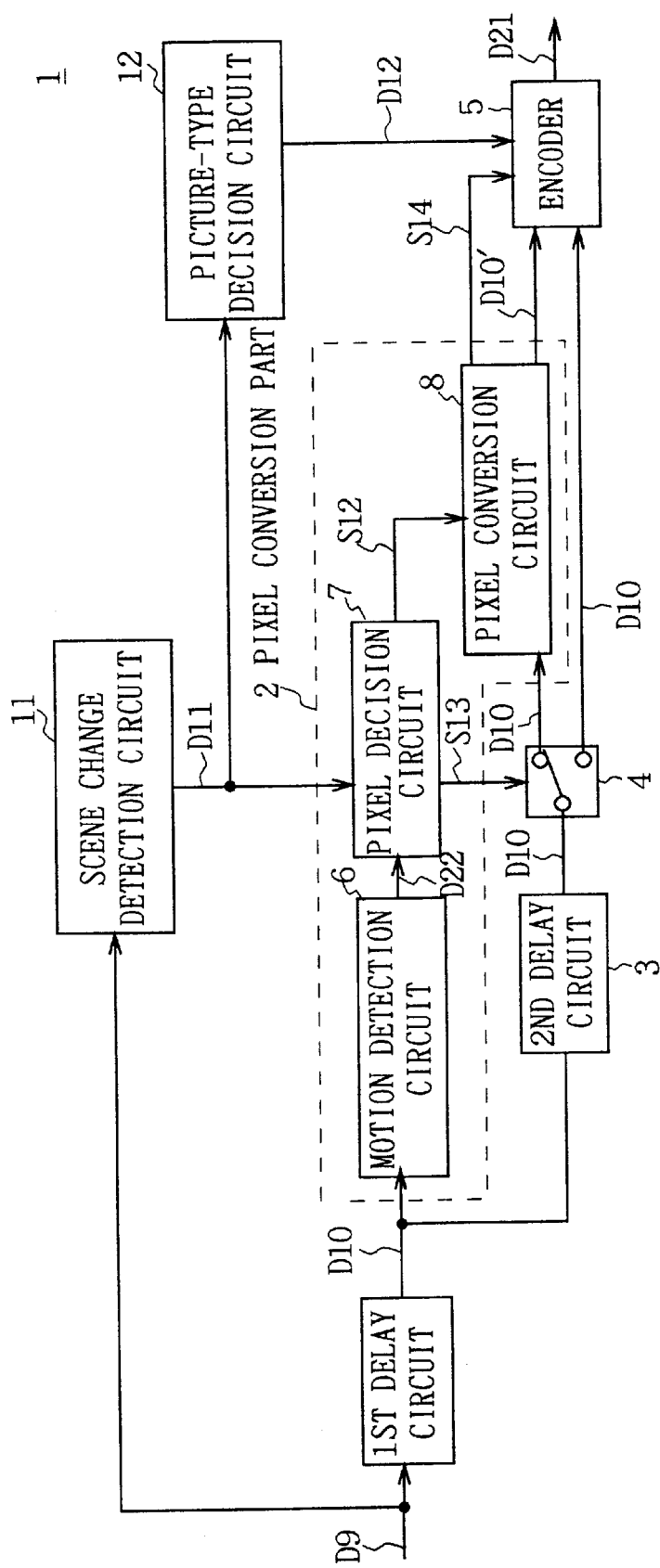
FIG. 8 is a block diagram showing the configuration of the data encoding device of the first embodiment according to the present invention.

Preferred embodiments of this invention will be described with reference to the accompanying drawings:

Referring to FIG. 8, 1 generally shows a data encoding device of the first embodiment of the present invention. Picture data D9 is sent to a first delay circuit 10 and a scene change detection circuit 11. The first delay circuit 10 delays the picture data D9 for a time during the execution of scene change detection by the scene change detection circuit 11, and sends this to a second delay circuit 3 and a pixel conversion part 2 as the pixel conversion means as picture data D10.

The second delay circuit 3 delays the picture data D10 for a fixed time and then sends this to the pixel conversion part 2 again via a switch circuit 4, as well as sending to an encoder 5. The pixel conversion part 2 reduces the number of pixels of the picture data D10 in a fixed conversion ratio, and sends this to the encoder 5 as pixel-converted picture data D10'.

Figure 9:
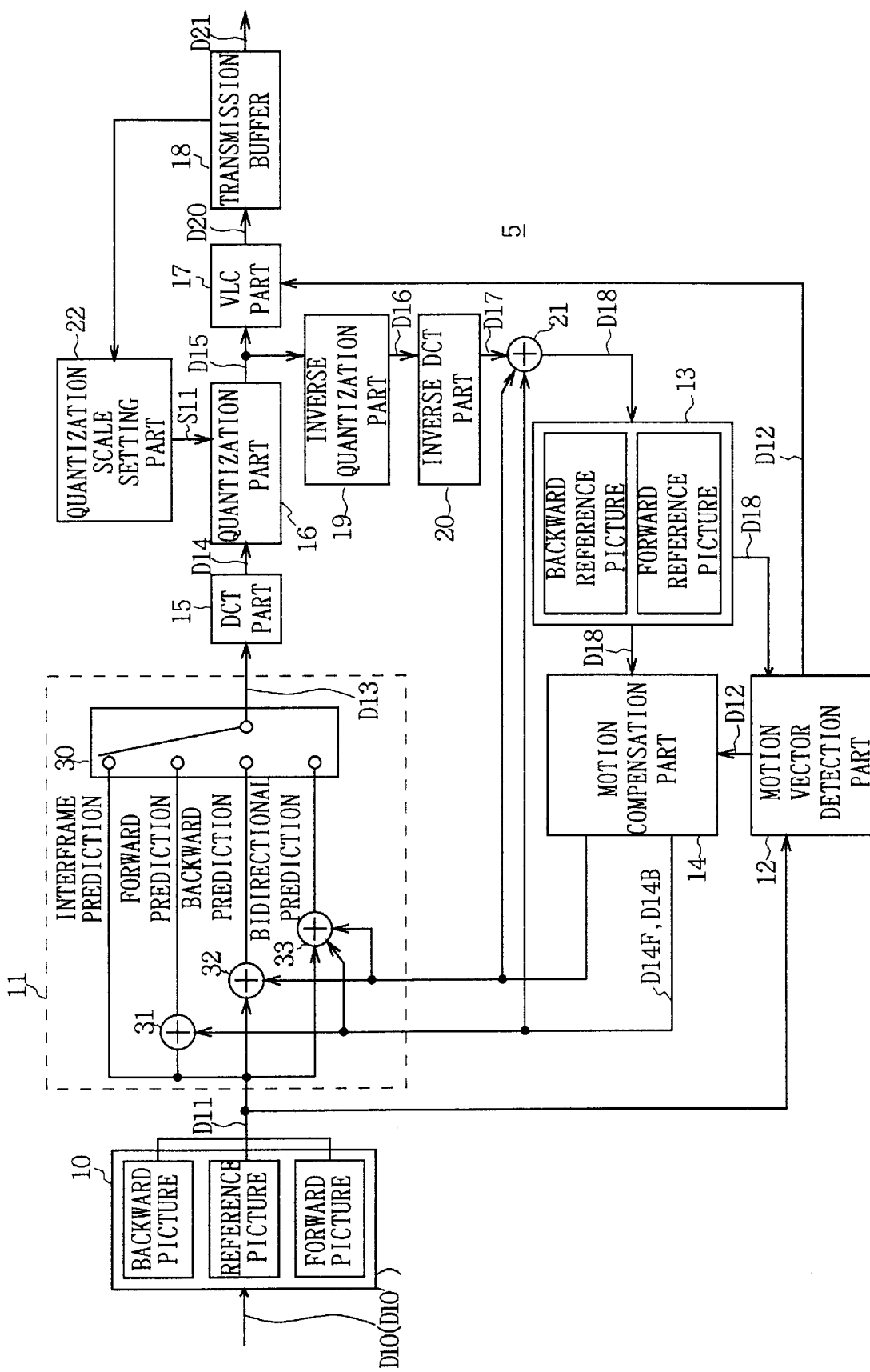
FIG. 9 is a block diagram showing the configuration of an encoder.

Here, as shown in FIG. 9, the encoder 5 as the encoding means stores the inputted picture data D10 (or the picture data D10') in a frame memory 10 in a frame unit with a classification into reference picture, forward (past) picture and backward (future) picture. In this case, the frame size of M (1920) pixel×N (1080) pixel is used.

Note that, the picture data D10 (or the picture data D10') is generated in the following manner: in a preprocessing part (not shown in figure), each frame picture is specified that should be processed as which picture type among I-picture, P-picture or B-picture, according to a preset sequence, and then the frame pictures are rearranged in order of being coded according to the above picture type, and further the above frame picture is divided into macroblocks each which is composed of a brightness signal in 16 pixel×16 pixel and color difference signals ($C_B$, $C_R$) corresponding to the above brightness signal.

The frame memory 10 reads the stored picture data D10 according to the picture type, and transmits this to a predictive coding part 11 and a motion vector detection part 12 as macroblock data D11.

The motion vector detection part 12 calculates the motion vector of each macroblock of the macroblock data D11 based on the above macroblock data D11 and reference picture data D18 in the backward (future) direction and/or the forward (past) direction stored in a frame memory 13. This is transmitted to a motion compensation part 14 and a variable length coding (VLC) part 17 as motion vector data D12.

The predictive coding part 11 performs the motion compensation in one of the following predictive modes, an intra-mode, a forward predictive mode, a backward predictive mode or a bidirectional predictive mode, according to the picture type of each macroblock of the macroblock data D11. Here, the intra-mode means a method for transmitting a frame picture to be encoded as it is as transmission data. The forward predictive mode means a method for transmitting a predictive residual between a frame picture to be encoded and a forward (past) predictive picture as transmission data.

The backward predictive mode means a method for transmitting a predictive residual between a frame picture to be encoded and a backward (future) predictive picture as transmission data. And the bidirectional predictive mode is a method for transmitting a predictive residual between a frame picture to be encoded, and the mean value of a forward (past) predictive picture and a backward (future) predictive picture, as transmission data.

First, the case where the macroblock data D11 is an I-picture will be described. In this case, the macroblock data D11 is processed in the intra-mode. That is, the predictive coding part 11 transmits the macroblock of the macroblock data D11 to a discrete cosine transform (DCT) part 15 as it is as operation data D13 via a switch 30.

The DCT part 15 performs DCT conversion processing to the operation data D13 and converting into DCT coefficients, and transmits this to a quantization part 16 as DCT coefficient data D14. The quantization part 16 performs quantization processing to the DCT coefficient data D14, and transmits this to the VLC part 17 and an inverse quantization part 19 as quantized DCT coefficient data D15.

At this time, the quantization part 16 adjusts a quantization step size in the quantization processing according to a quantization control signal S11 supplied from a quantization scale setting part 22, and controlling the code amount of the quantized DCT coefficient data D15 to be generated.

The inverse quantization part 19 applies inverse quantization processing on the quantized DCT coefficient data D15, and transmits this to an inverse DCT part 20 as DCT coefficient data D16. The inverse DCT part 20 applies inverse DCT processing on the DCT coefficient data D16, and transmits this to a computing unit 21 as operation data D17 and stores the above operation data D17 in the frame memory 13 as it is as reference picture data D18.

Secondly, the case where the macroblock data D11 is a P-picture will be described. In this case, the predictive coding part 11 performs motion compensation to the macroblock data D11 in either an intra-mode or a forward predictive mode.

If the predictive mode is the intra-mode, the predictive coding part 11 transmits the macroblock of the macroblock data D11 to the DCT part 15 as it is as the operation data D13 as well as in the aforementioned case of I-picture. The operation data D13 is subjected to the processing in the DCT part 15 to the computing unit 21 as well as in the aforementioned case of I-picture, and is stored in the frame memory 13 as reference picture data D18.

If the predictive mode is the forward predictive mode, the predictive coding part 11 performs subtraction processing to the macroblock data D11 by using forward predictive picture data D14F supplied from the motion compensation part 14 with a computing unit 31. Here, the forward predictive picture data D14F is calculated by that the reference picture data D18 stored in the frame memory 13 is motion compensated according to the motion vector data D12.

That is, the motion compensation part 14 reads the reference picture data D18 with shifting the read address of the frame memory 13 to an address position based on the motion vector data D12 in the forward prediction mode, and supplies this to the computing unit 31 and a computing unit 21 individually as the forward predictive picture data D14F. The computing unit 31 subtracts the forward predictive picture data D14F from the macroblock data D11 to obtain difference data as a predictive residual, and transmits this to the DCT part 15 via the switch 30 as operation data D13.

The operation data D13 is DCT-converted in the DCT part 15, and is further quantized in the quantization part 16. This is transmitted to the VLC part 17 and the inverse quantization part 19 individually as quantized DCT-converted data D15. Also at this time, the quantization part 16 adjusts a quantization step size in the quantization processing according to a quantization control signal S11 supplied from a quantization scale setting part 22 to control the code amount of the quantized DCT-converted data D15 to be generated.

The quantized DCT-converted data D15 transmitted to the inverse quantization part 19 is inversely quantized, and is transmitted to the inverse DCT part 20 as DCT-converted data D16. The DCT-converted data D16 is subjected to inverse DCT processing in the inverse DCT part 20, and is transmitted to the computing unit 21 as operation data D17. Here, the forward predictive picture data D14F has been supplied to the computing unit 21 from the motion compensation part 14, and the above computing unit 21 adds the above forward predictive picture data D14F to the operation data D17 and locally reproducing the reference picture data D18 (P-pictures), and stores this in the frame memory 13.

Thirdly, the case where the macroblock data D11 is a B-picture will be described In this case, the predictive coding part 11 performs motion compensation processing to the macroblock data D11 in one of the following predictive modes, an intra-mode, a forward predictive mode, a backward predictive mode and a bidirectional prediction mode.

If the prediction mode is the intra-mode or the forward predictive mode, the macroblock data D11 receives the same processing as in the aforementioned case of P-picture. However, since a B-picture is not used as a reference picture, it is not stored in the frame memory 13.

If the predictive mode is the backward predictive mode, the predictive coding part 11 performs subtraction processing using backward predictive picture data D14B supplied from the motion compensation part 14 with respect to the macroblock data D11. Here, the backward predictive picture data D14B is calculated by that the reference picture data D18 stored in the frame memory 13 is motion-compensated based on the motion vector data D12.

That is, the motion compensation part 14 reads the reference picture data D18 with shifting the read address of the frame memory 13 to an address position based on the motion vector data D12 in the backward predictive mode, and supplies this to the computing units 32 and 21 as backward predictive picture data D14B. The computing unit 32 subtracts the backward predictive picture data D14B from the macroblock data D11 and obtaining difference data as a predictive residual, and transmits this to the DCT part 15 via the switch 30 as operation data D13.

The operation data D13 is DCT-converted in the DCT part 15, and is further quantized in the quantization part 16. This is transmitted to the VLC part 17 and the inverse quantization part 19 as quantized DCT-converted data D15. Also at this time, the quantization part 16 adjusts a quantization step size in the quantization processing according to the quantization control signal S11 supplied from the quantization scale setting part 22 to control the code amount of the quantized DCT-converted data D15 to be generated.

The quantized DCT-converted data D15 transmitted to the inverse quantization part 19 is subjected to inverse quantization processing, and this is transmitted to the inverse DCT part 20 as DCT-converted data D16. The DCT-converted data D16 is subjected to inverse DCT processing in the inverse DCT part 20, and is transmitted to the computing unit 21 as operation data D17.

Here, the backward predictive picture data D14B has been supplied to the computing unit 21 from the motion compensation part 14, and the computing unit 21 adds the above backward predictive picture data D14B to the operation data D17 and locally reproducing the reference picture data D18 (B-pictures). However, since a B-picture is not used as predictive reference picture for others, the reference picture data D18 in this case is not stored in the frame memory 13.

If the predictive mode is the bidirectional mode, the predictive coding part 11 subtracts the mean value of the forward predictive picture data D14F and the backward predictive picture data D14B supplied from the motion compensation part 14, from the macroblock data D11, and obtaining difference data as a predictive residual, and transmits this to the DCT part 15 as operation data D13.

The operation data D13 is DCT-converted in the DCT part 15, and is further quantized in the quantization part 16. This is transmitted to the VLC part 17 and the inverse quantization part 19 as quantized DCT-converted data D15. Also at this time, the quantization part 16 adjusts a quantization step size in the quantization processing according to the quantized control signal S11 supplied from the quantization scale setting part 22 to control the code amount of the quantized DCT-converted data D15 to be generated.

The quantized DCT-converted data D15 transmitted to the inverse quantization part 19 is subjected to inverse quantization processing, and this is transmitted to the inverse DCT part 20 as DCT-converted data D16. The DCT-converted data D16 is subjected to inverse DCT processing in the inverse DCT part 20, and is transmitted to the computing unit 21 as operation data D17.

Here, the forward predictive picture data D14F and the backward predictive picture data D14B have been supplied to the computing unit 21 from the motion compensation part 14, and the above computing unit 21 adds the mean value of the above forward predictive picture data D14F and the backward predictive picture data D14B to the operation data D17 to generate reference picture data D18 (B-pictures). However, since a B-picture is not used as predictive reference picture for others, the reference picture data D18 is not stored in the frame memory 13 either in this case.

In this manner, the picture data D10 (or the picture data D10') inputted to the encoder 5 is subjected to the motion compensation processing, the DCT processing and the quantization processing, and is supplied to the VLC part 17 as the quantized DCT coefficient data D15. The VLC part 17 applies variable length coding processing on the quantized DCT coefficient data D15 and the motion vector data D12, and transmits this to a transmission buffer 18 as variable-length coded data D20. The transmission buffer 18 accumulates the variable-length coded data D20 for a fixed time, and then outputs it as fixed-length coded data D21 for each fixed period (for each GOP).

On the other hand, the picture data D10 transmitted to the pixel conversion part 2 is inputted to a motion detection circuit 6. The motion detection circuit 6 divides the frame pictures of the picture data D10 into macroblocks each which is composed of a brightness signal of 16 pixel×16 pixel and color difference signals ($C_B$, $C_R$) corresponding to the above brightness signal.

Then, the motion detection circuit 6 selects one reference block from among a plurality of the divided macroblocks, determines which one is the most similar to that among many candidate blocks existing in a search area set in the previous frame picture, by calculating the difference value of brightness (hereinafter, this technique is called a block matching method), and detects a positional shift with the most similar candidate block as motion vectors.

Moreover, the motion detection circuit 6 detects all motion vectors for each macroblock as the above, adds all of them to calculate the absolute sum of the motion vectors for each frame, and transmits this to a pixel decision circuit 7 as motion vector data D22 to represent the feature quantity of the frame pictures.

If the motion vector data D22, i.e., the absolute sum of the motion vectors exceeds a prescribed threshold, the pixel decision circuit 7 can judge that the moving amount of the frame picture is large. In this case, if the frame picture is encoded by the encoder 5 in the present number of pixels, the information amount increases too much. Therefore, the quantization step size must be set again to a big value. However, image quality is unfortunately deteriorated accompanying with that.

Therefore, the pixel decision circuit 7 judges that the number of pixels of frame pictures must be changed in such case, and transmits a conversion signal S12 to convert it into a preset number of pixels at this time to a pixel conversion circuit 8, as well as transmitting a switch signal S13 to switch the destination of the output of the switch circuit 4 from the encoder 5 to the pixel conversion circuit 8, to the switch circuit 4.

Figure 10:
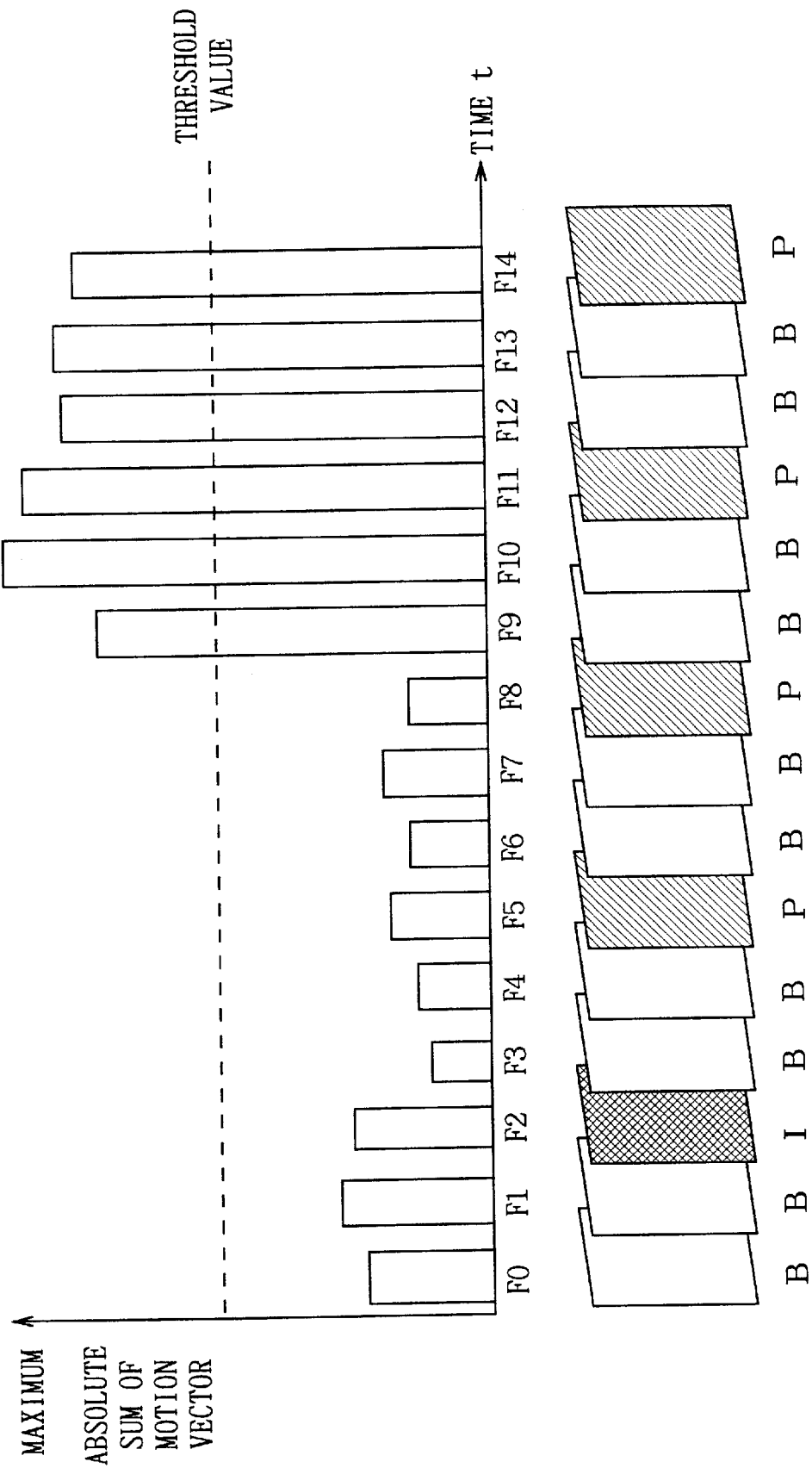
FIG. 10 is a schematic diagram explaining the standard of judgment when changing the number of pixels.

That is, for instance, as shown in FIG. 10, the pixel decision circuit 7 compares the motion vector data D22 sequentially calculated for each frame F0–F14 with the prescribed threshold value. As a result, if it is detected that the absolute sum of the motion vectors after a frame F9 exceeds the prescribed threshold value, it is judged that there was a big motion in the pictures between frame F0—frame F8 and frame F9—frame F14.

At this time, the pixel decision circuit 7 transmits the conversion signal S12 to convert the frame picture in M (1920) pixel×N (1080) pixel into the preset frame picture in m (1440) pixel×n (720) pixel, to the pixel conversion circuit 8.

By the way, in the second delay circuit 3, the picture data D10 is outputted for each frame, at the timing delayed for a time until changing the number of pixels is decided in the motion detection circuit 6 and the pixel decision circuit 7. Thereby, the conversion signal S12 is inputted from the pixel decision circuit 7 to the pixel conversion circuit 8 synchronizing with the timing at which the picture data D10 is inputted to the pixel conversion circuit 8 via the switch circuit 4.

The pixel conversion circuit 8 converts the picture data D10 into the preset number of pixels, m (1440) pixel×n (720) pixel according to the conversion signal S12, and transmits this to the encoder 5 as the pixel-converted picture data D10'.

Figure 11:
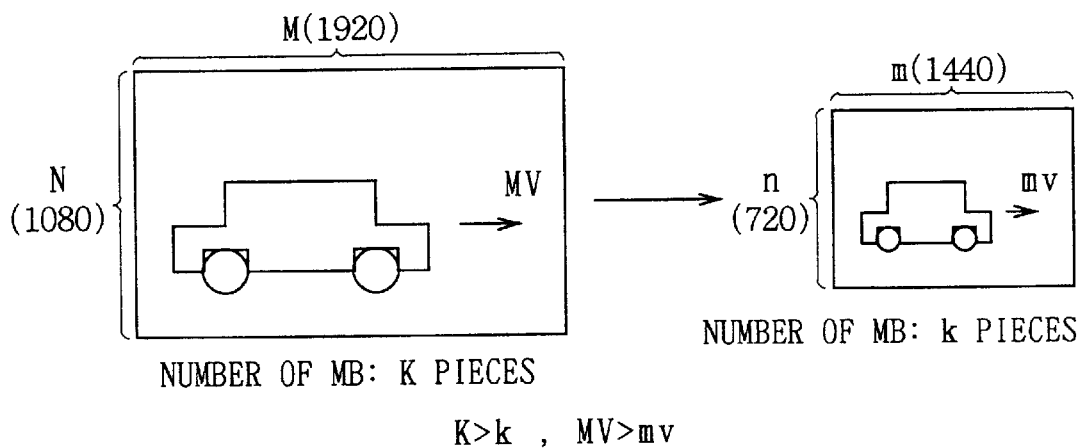
FIG. 11 is a schematic diagram explaining the conversion of the number of pixels.

In this case, as shown in FIG. 11, a frame picture in M (1920) pixel×N (1080) pixel is converted into a frame picture in m (1440) pixel×n (720) pixel so that the total number of macroblocks decreases from K pieces to k pieces. The picture itself becomes smaller accompanying with that. Therefore, in the picture data D10' with the frame pictures pixel-converted, the size itself of motion vectors decreases from motion vectors MV to motion vectors mv as well as the number of macroblocks becomes from K pieces to k pieces.

Figure 12:
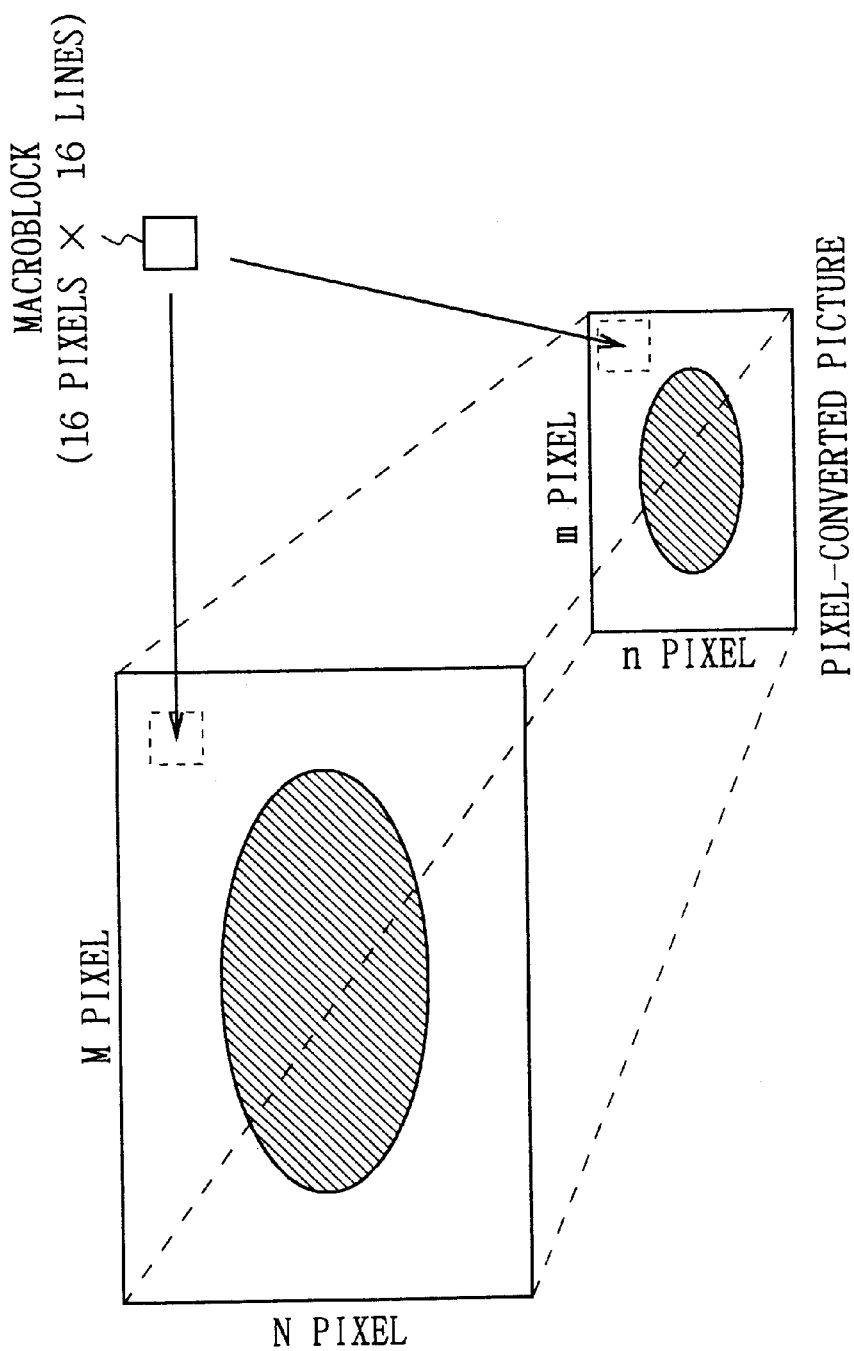
FIG. 12 is a schematic diagram showing the macroblock after the conversion of the number of pixels.

As shown in FIG. 12, since the total number of macroblocks of a frame picture before pixel-converted (picture data D10) decreases than a frame picture after pixel-converted (picture data D10'), the size of image part displayed by one macroblock changes. That is, an image part displayed by a macroblock after pixel-converted is rough.

At this time, though the image part displayed by a macroblock after pixel-converted is rough, since a redundancy in the original picture data D10 itself is high, the image quality does not deteriorate even if the number of pixels is reduced in some degree.

The pixel conversion circuit 8, as well as converting the number of pixels of a frame picture into m (1440) pixel×n (720) pixel, transmits a sequence end code which means the end of the bitstream of the current frame picture in M (1920) pixel×N (1080) pixel, and sequence header information to start a new bitstream after that, to a preprocessing part (not shown in figure) in the encoder 5 as a sequence control signal S14.

Figure 13:
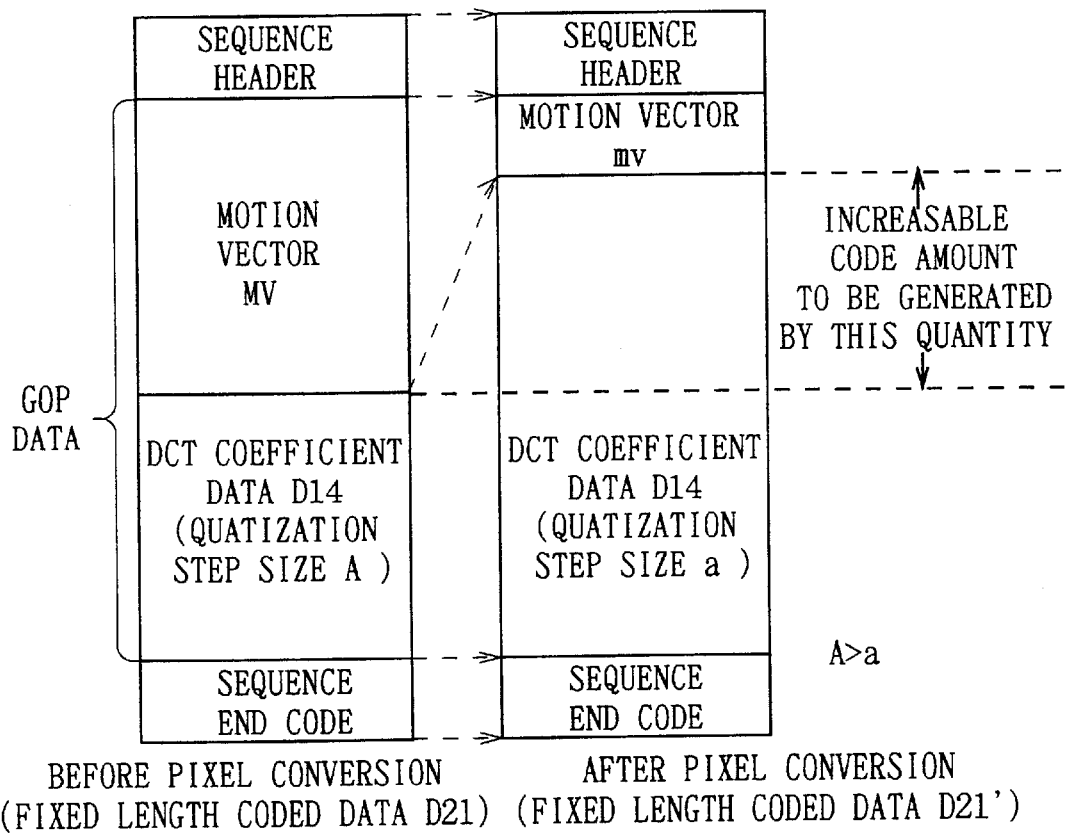
FIG. 13 is a schematic diagram explaining the difference of the amount of codes generated before and after the conversion of the number of pixels.

By the way, in the encoder 5, when the picture data D10 (or the picture data D10') is encoded and fixed-length coded data D21 is generated, as shown in FIG. 13, a sequence header information is previously written to the previous step of a bitstream of GOP data, as well as a sequence end code with the same number of bits as the sequence header information being always "0" to the subsequent step of that.

Figure 14:
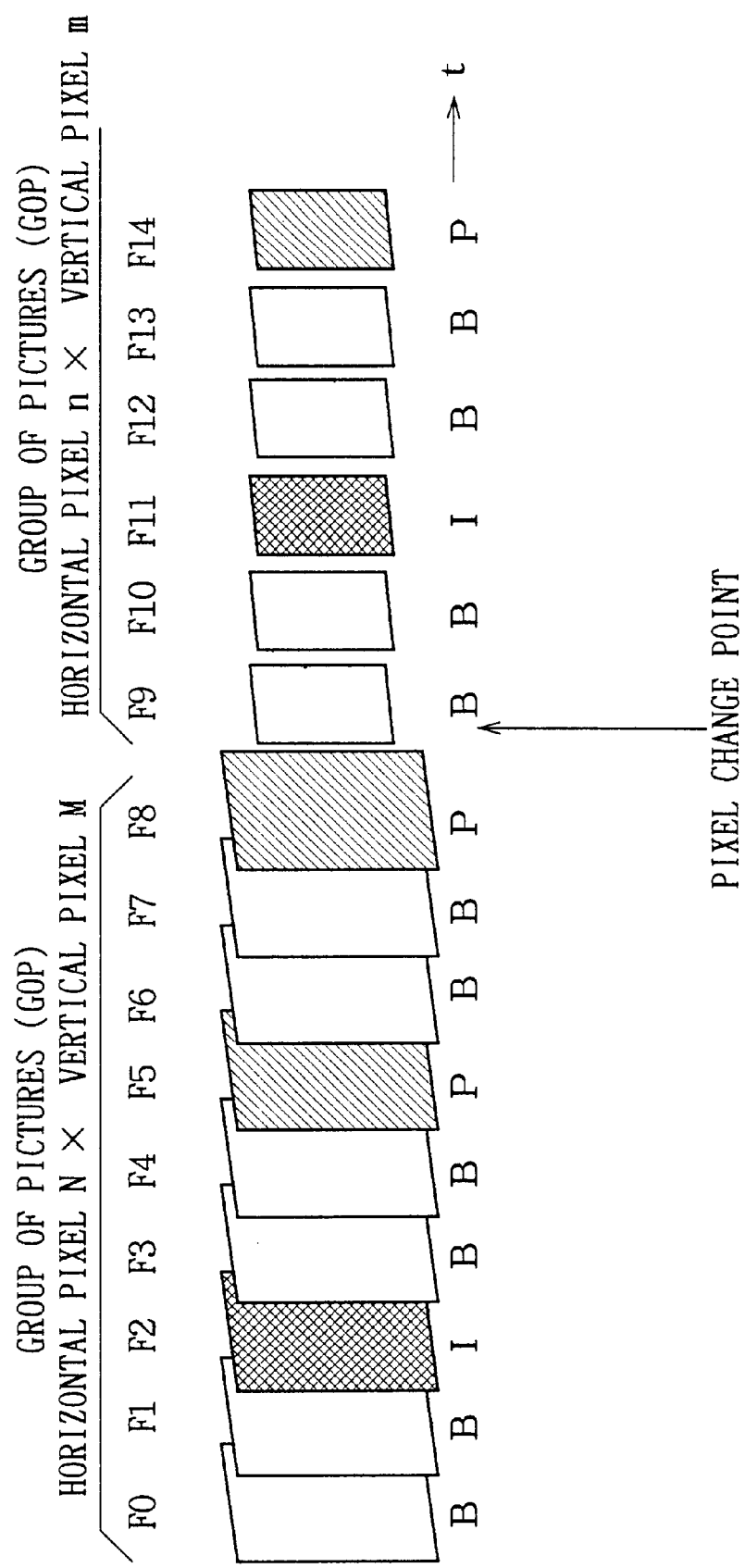
FIG. 14 is a schematic diagram showing a pixel change point.

Thereby, in the encoder 5, when the picture data D10' pixel-converted is encoded by the control of the preprocessing part as shown in FIG. 14, the I-picture of F9 or an I-picture of after than that, e.g., F11, is encoded as a reference picture without using, e.g., the frame picture (P-picture) of F8 as a reference picture. Therefore, the encoder 5 can prevent a malfunction that a frame picture after pixel-converted is encoded using a frame picture before pixel-converted as a reference picture.

When the pixel conversion circuit 8 practically reduces a number of pixels, a conversion ratio to convert M (1920) pixels before pixel conversion into m (1440) pixels is 3:2. The pixel conversion circuit 8 uprates to twice the M (1920) pixels and then decimates it into half for oversampling.

Figure 15:
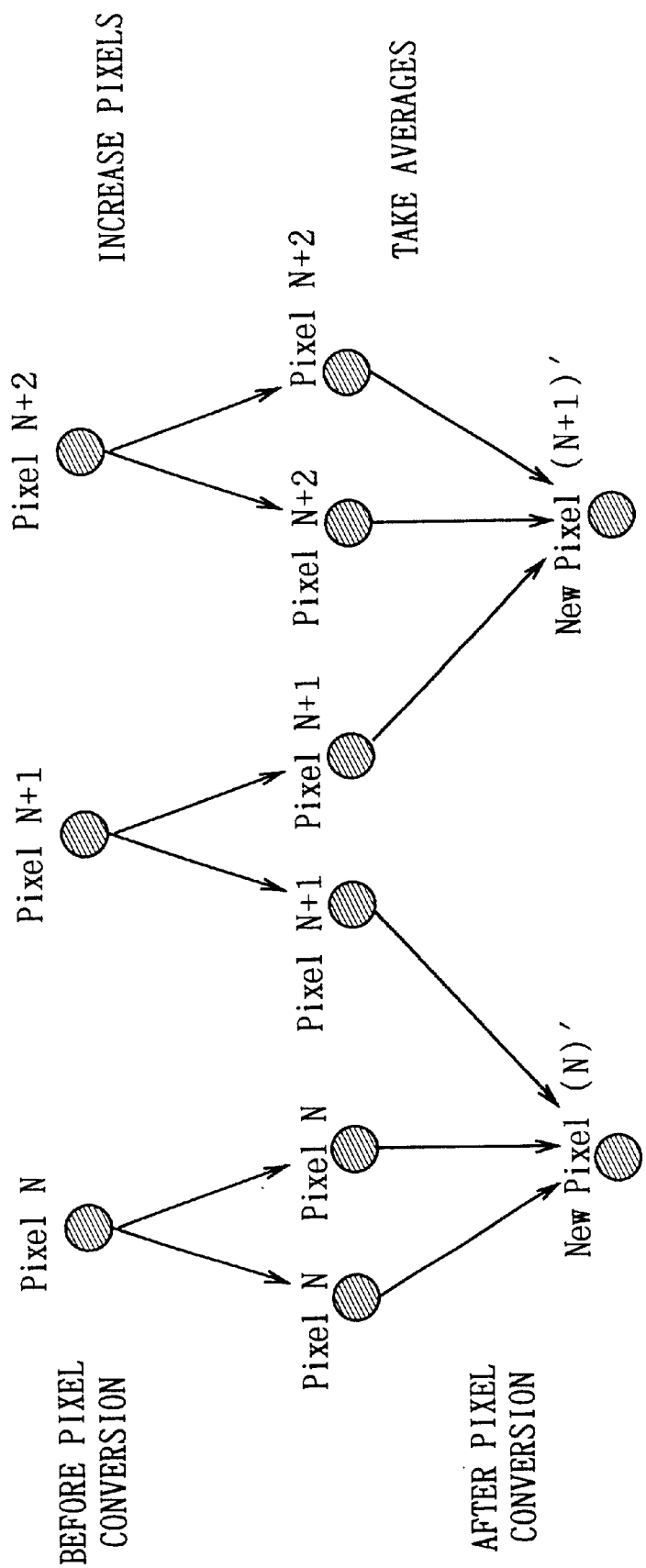
FIG. 15 is a schematic diagram showing an oversampling technique.

For instance, as shown in FIG. 15, a number of pixels of a frame picture is uprated to twice (six pieces) based on a pixel N, a pixel N+1 and a pixel N+2 of the frame picture. Then, the mean value is calculated in a unit of several pixels including different kinds of pixels (pixels N and a pixel N+1, a pixel N+1 and pixels N+2), so that a new pixel (N)' and a new pixel (N+1)' are generated. Thus, the number of pixels can be reduced in a conversion ratio of 3:2. Also when N (1080) pixel is converted into n (720) pixel, it is in a similar manner.

In thus pixel-converted picture data D10', since a number of macroblocks decreases in proportion to the decrease of the number of pixels, a code amount of a motion vector in encoding by the encoder 5 also decreases. In fixed-length coded data D21 (FIG. 13) to be outputted from the encoder 5, since the amount of codes to be generated is fixed between before pixel conversion and after. Thus, in the encoder 5, the code amount of a motion vector reduced in proportion to a decrease in a number of macroblocks can be allotted to a code amount of DCT coefficient data D14.

As a result, the quantization scale setting part 22 can quantize the DCT coefficient data D14 after pixel conversion in a more fine step "a" than a quantizing step A that had been done before pixel conversion. This increases coefficient values of the DCT coefficient data D14, so that the fixed-length coded data D21 which prevents the lowering of a resolution in a DCT space can be generated.

Figure 1A:
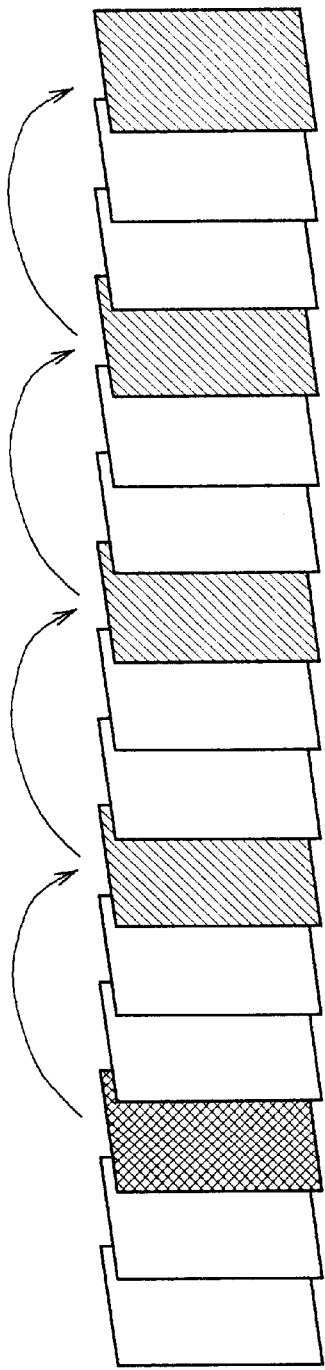
FIGS. 1A and 1B are schematic diagrams explaining a compression coding method.
Figure 1B:
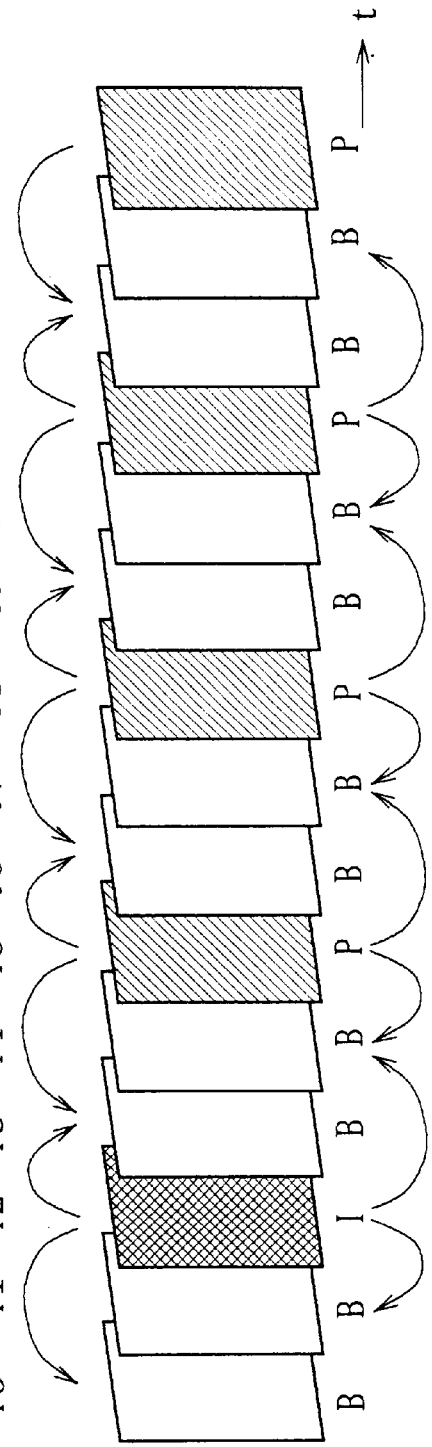
Figure 2:
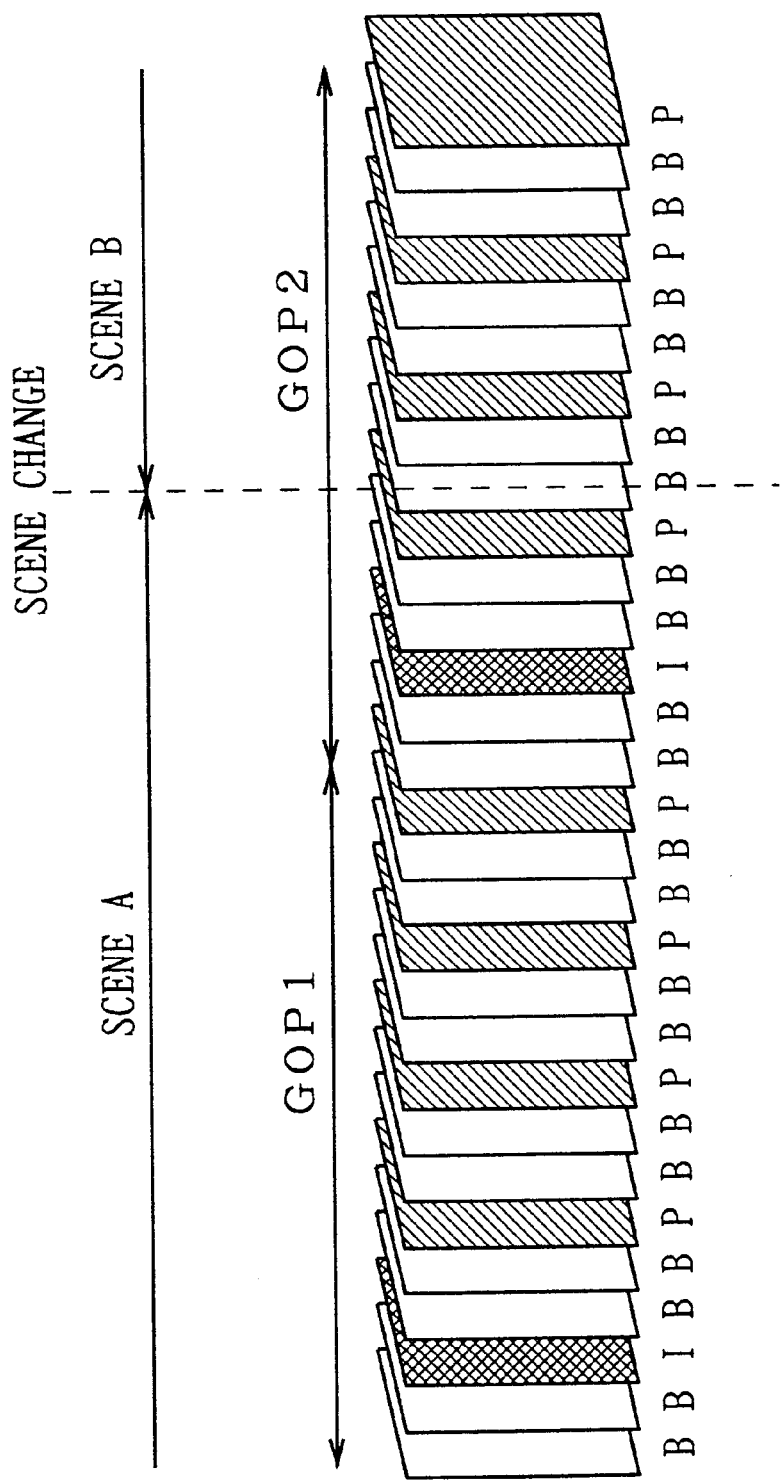
FIG. 2 is a schematic diagram showing the timing of the scene change.
Figure 3:
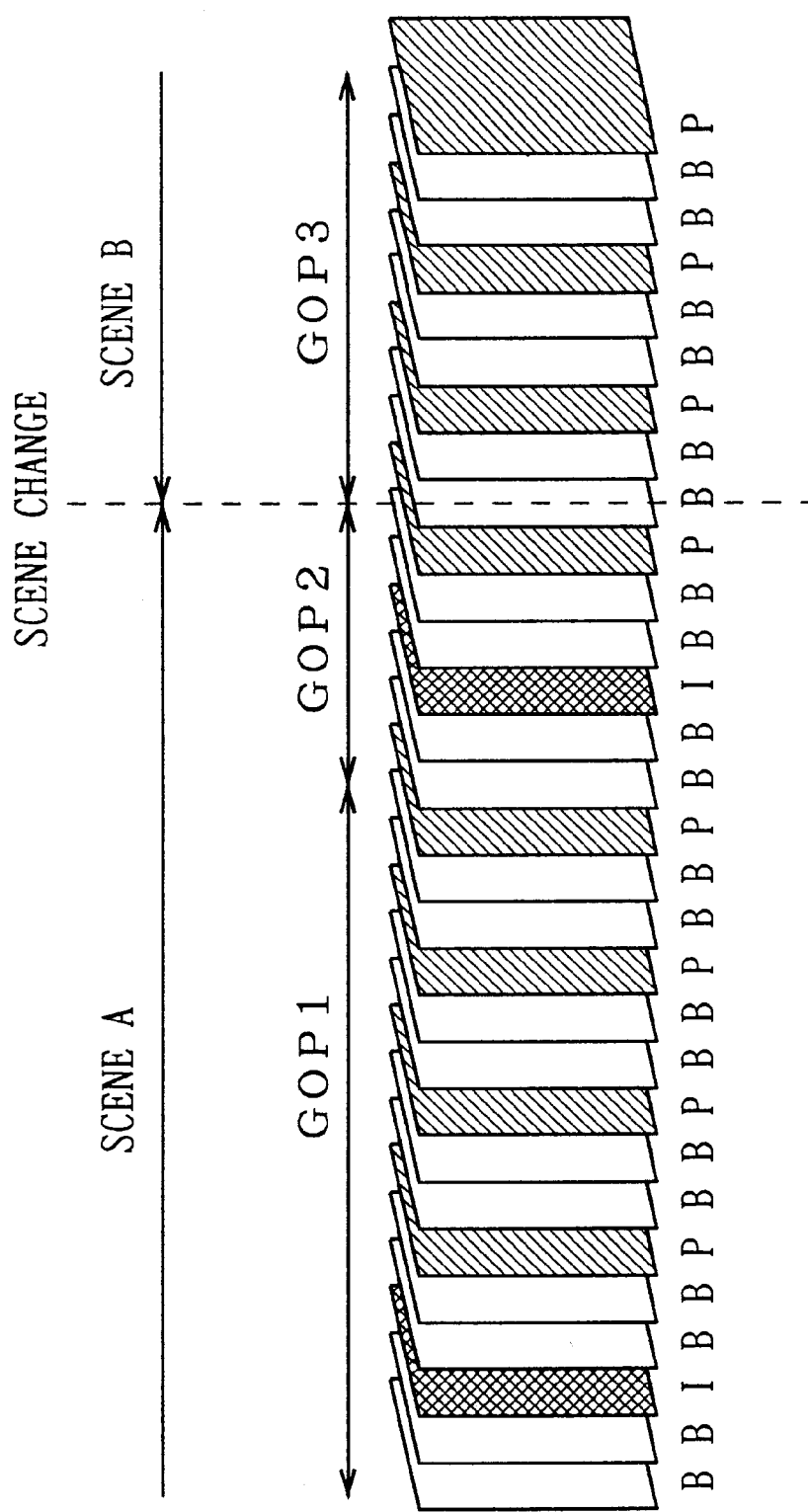
FIG. 3 is a schematic diagram explaining the prevention from the propagation of the deterioration of image quality.
Figure 4:
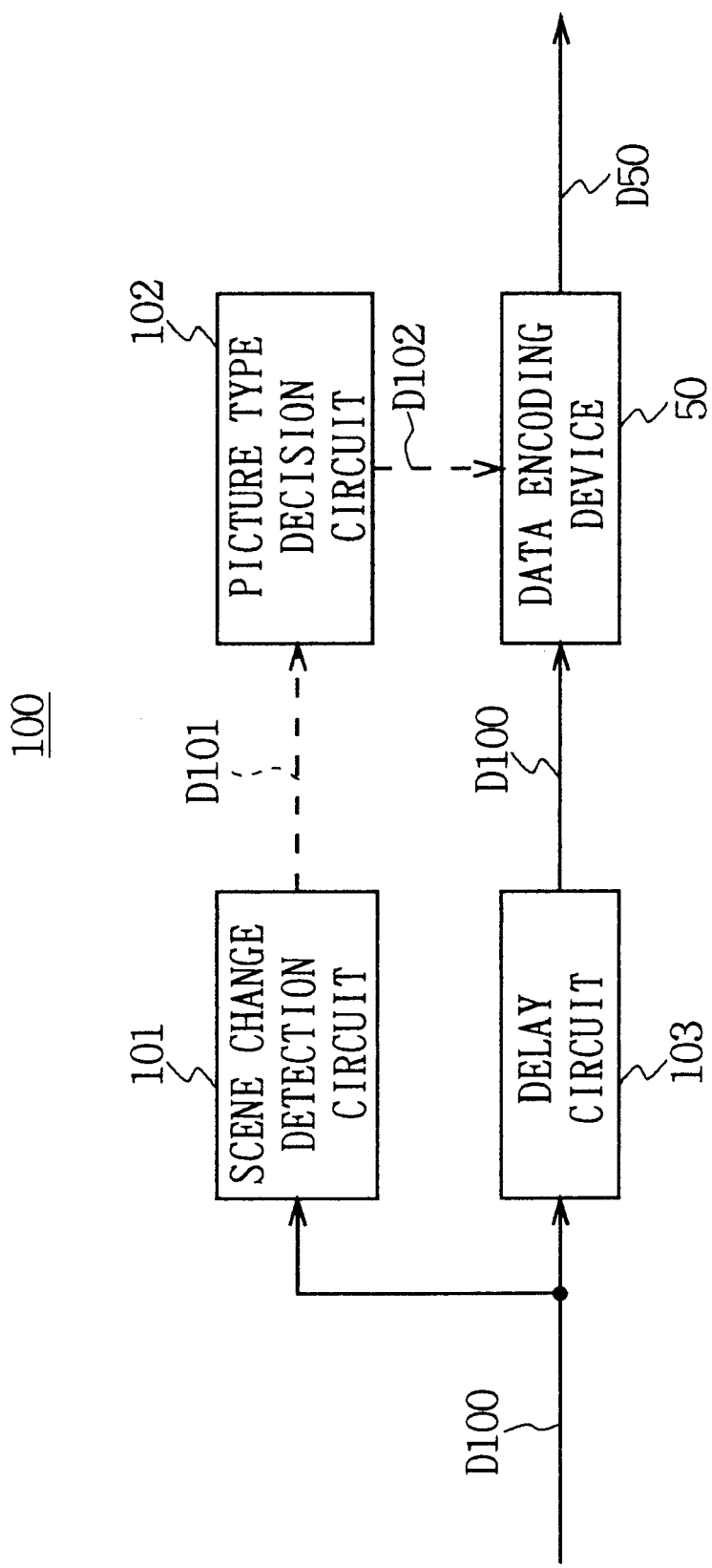
FIG. 4 is a block diagram showing the configuration of a data encoding device for performing scene change detection as in the past.
Figure 5:
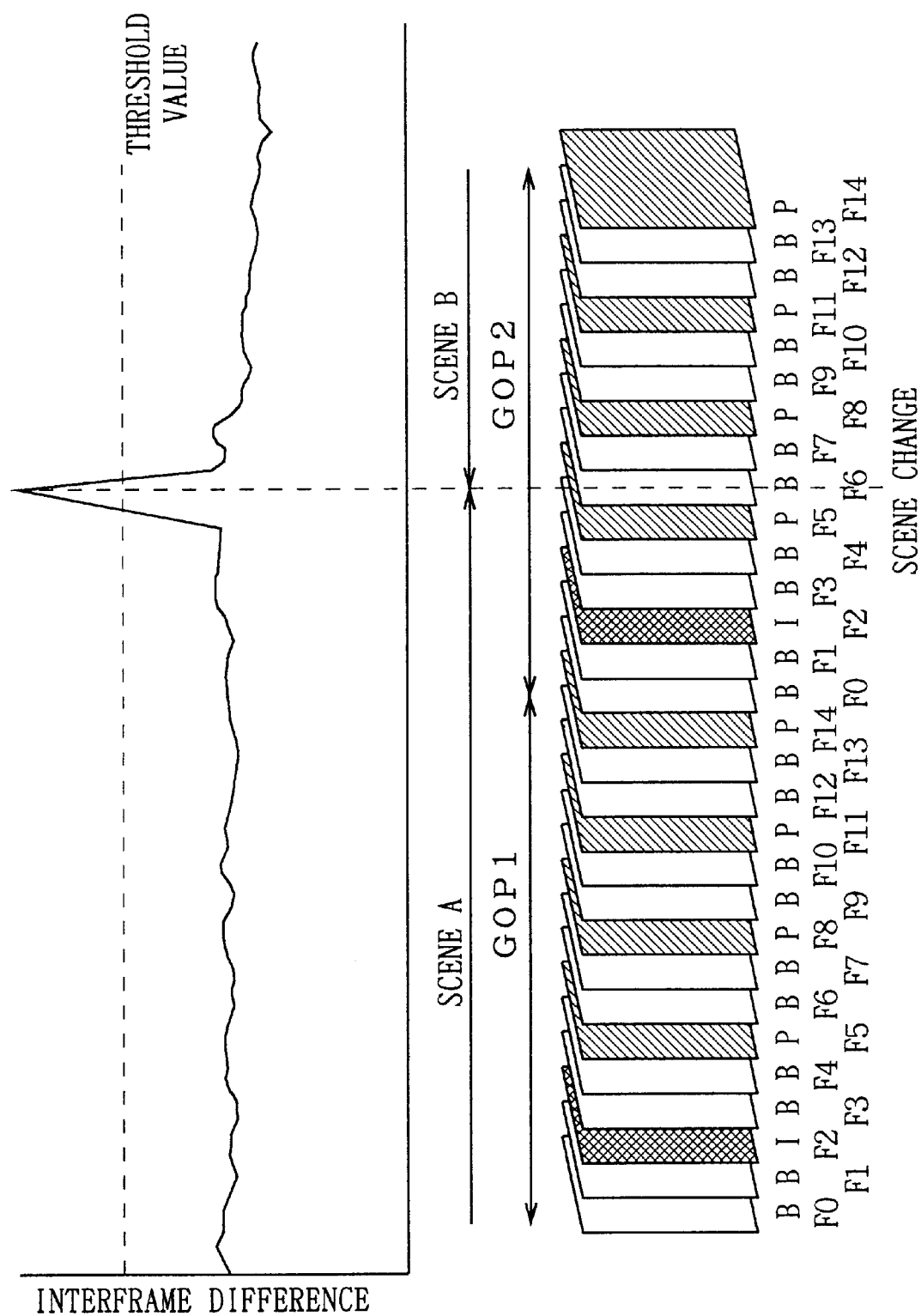
FIG. 5 is a schematic diagram explaining the scene change detection.
Figure 6:
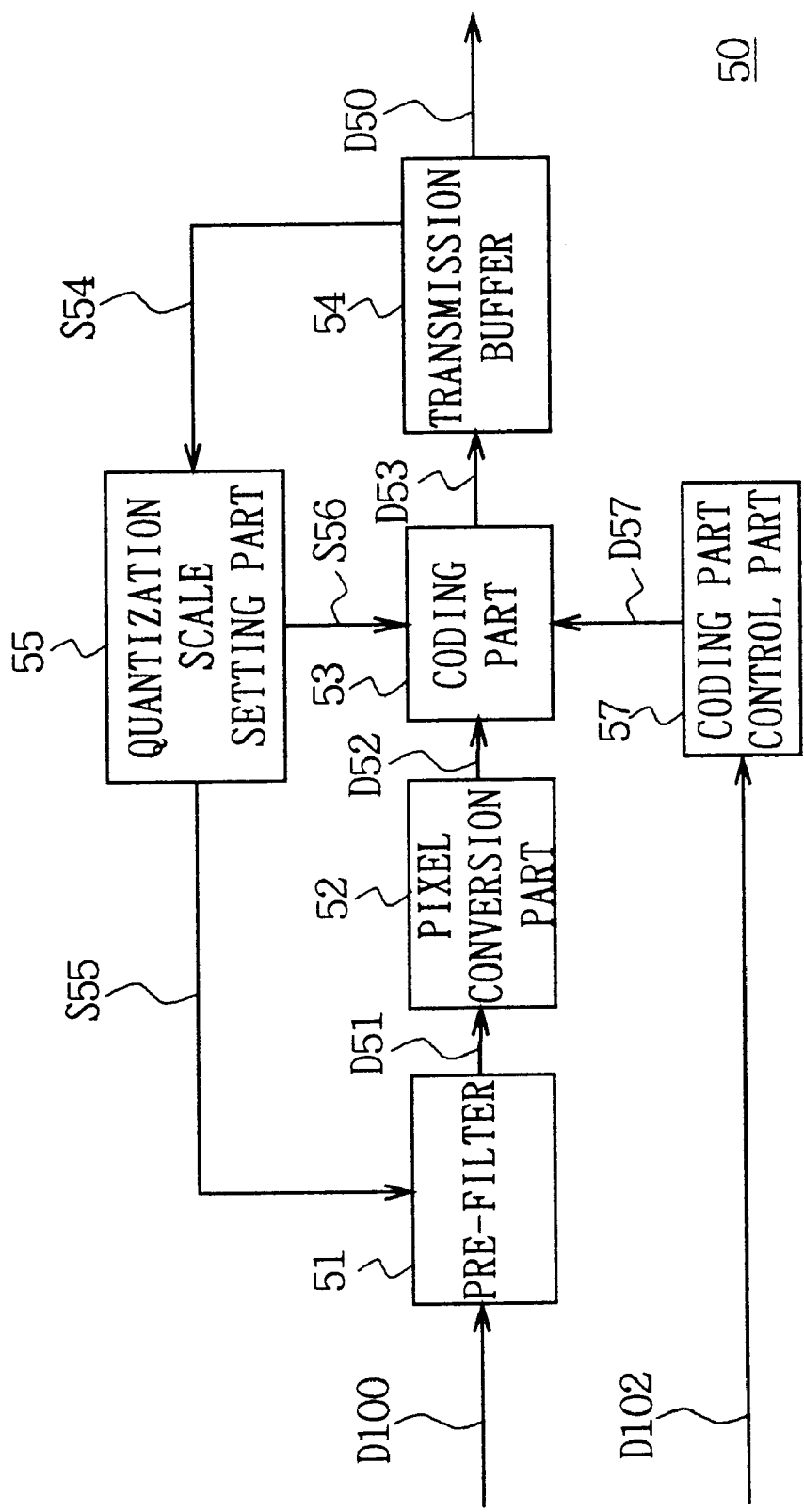
FIG. 6 is a block diagram showing the configuration of a conventional data encoding device.
Figure 7:
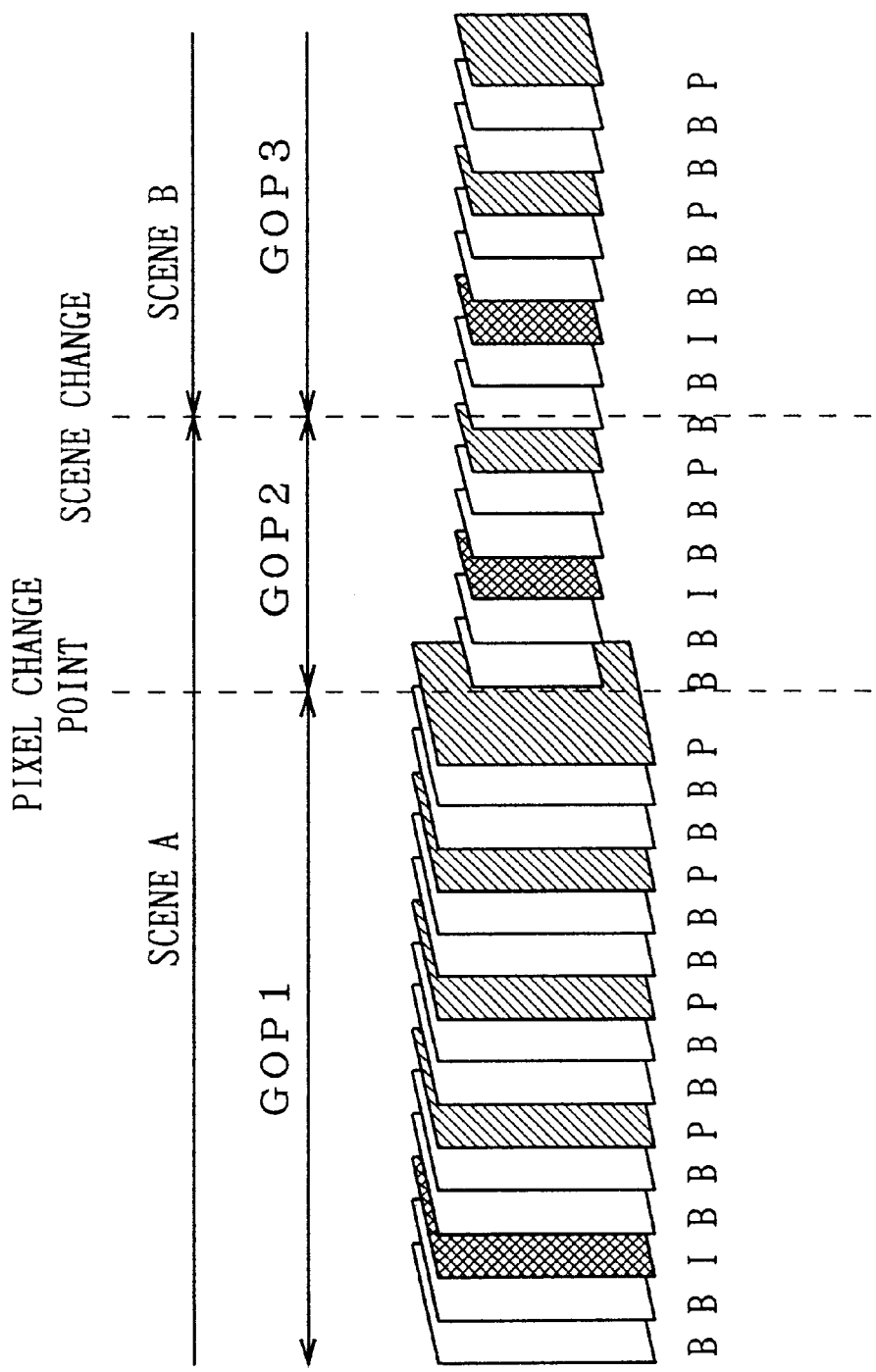
FIG. 7 is a schematic diagram showing the timing of a pixel change point and a scene change as in the past.

By the way, the scene change detection circuit 11 calculates an absolute difference sum of brightness between two adjacent frame pictures based on the picture data D9, and if the above absolute difference sum of brightness exceeds a prescribed threshold value, it judges that a scene changes (FIG. 5), and at this time, it transmits scene change detection data D11 to the pixel decision circuit 7 of the pixel conversion part 2 and the picture type decision circuit 12.

The pixel decision circuit 7 judges that the number of pixels must be changed, when the motion vector data D22 supplied from the motion detection circuit 6 exceeds a prescribed threshold value, however, only when the scene change detection data D11 is supplied, it transmits a switch signal S13 to the switch circuit 4 and transmits the conversion signal S12 to the pixel conversion circuit 8.

That is, in the pixel conversion part 2, only when the scene change detection data D11 is supplied from the scene change detection circuit 11, the picture data D10' is pixel-converted based on the above scene change detection data D11 and transmits this to the encoder 5. Since the pixel decision circuit 7 does not transmit the switch signal S13 to the switch circuit 4 until receiving the scene change detection data D11, the picture data D10 is transmitted to the encoder 5 as it is without receiving pixel conversion in this case.

Figure 16:
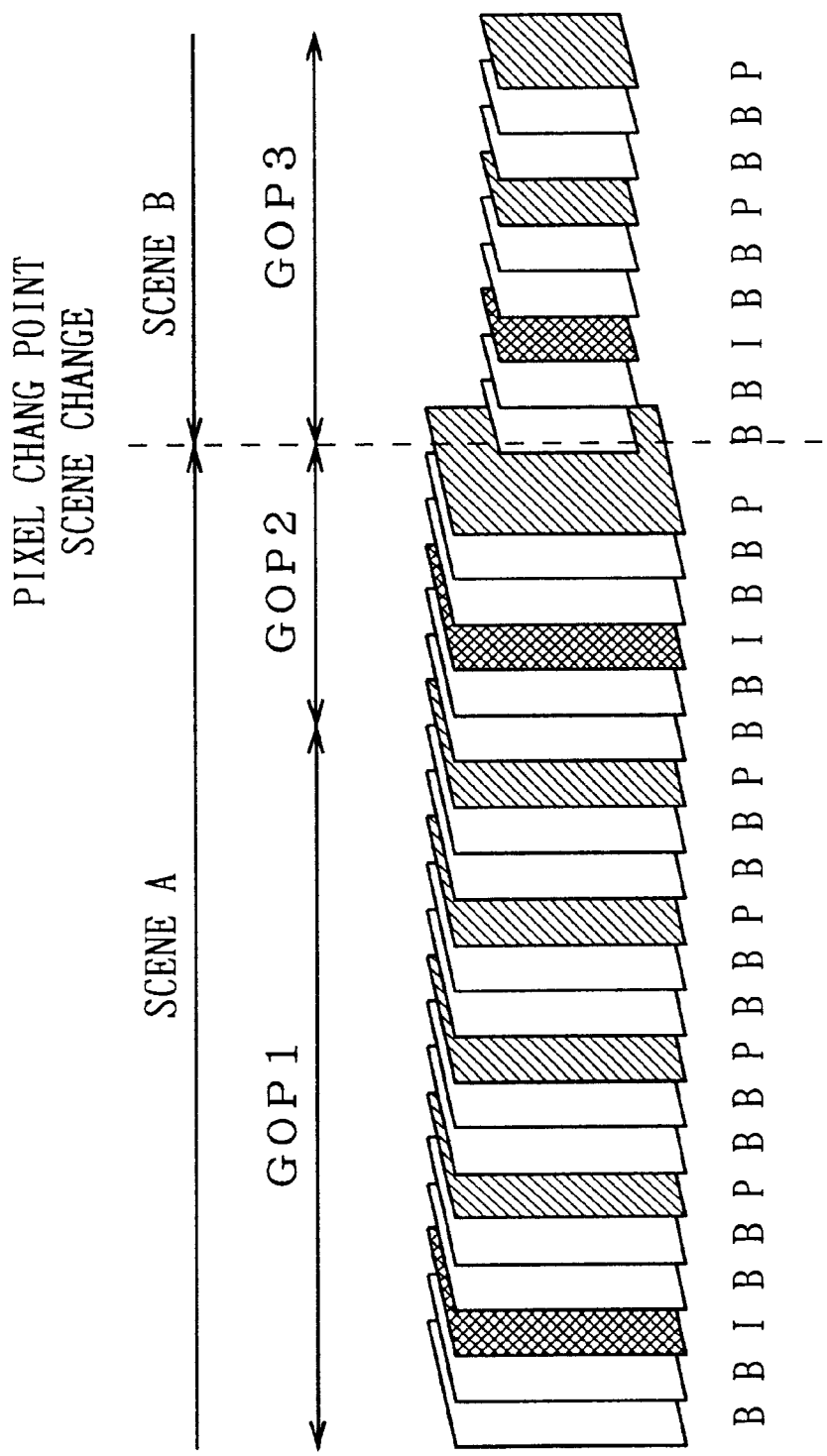
FIG. 16 is a schematic diagram showing the state where the pixel change point is matched to the timing of the scene change.

As shown in FIG. 16, when encoding frame pictures in a GOP 3 after a scene change, the picture decision circuit 12 supplies specification data D12 to specify a picture type to prevent the use of a frame picture in the previous GOP 2 as a reference frame, to the preprocessing part (not shown in figure) of the encoder 5.

Thereby, when predictively coding frame pictures after a scene change, the encoder 5 can perform predictive coding using an I-picture in the GOP 3 after the scene change as a reference picture without using a frame picture before the scene change as a reference picture. Thus, the propagation of the deterioration of image quality can be prevented.

According to the above structure, the data encoding device 1 supplies the scene change detection data D11 to the pixel conversion part 2 when a scene change is detected by the scene change detection circuit 11. At this time, in the pixel conversion part 2, even if the necessity of reducing a number of pixels according to the motion vector data D22 occurs, pixel conversion is waited until receiving the scene change detection data D11. The number of pixels is reduced in a prescribed conversion ratio at the timing when the above scene change detection data D11 is supplied, and this is outputted to the encoder 5 as the picture data D10'.

The encoder 5 performs encoding processing at the timing of a scene change based on the pixel-converted picture data D10, and outputs this as the fixed-length coded data D21. Thereby, in the data encoding device 1, a frame size can be changed by reducing the number of pixels of the picture data D10 synchronizing with the timing of a scene change where a scene A ends with the GOP 2 and a scene B begins at the GOP 3 (FIG. 16).

As the above, in the data encoding device 1, since the timing of a scene change is synchronized with the timing for converting the number of pixels of the picture data D10, a frame size is not changed in the same scene but changed at a scene change. It makes a viewer hardly notice a change in image quality and free from unnatural feeling. It makes easy to see very much.

Moreover, in the picture data D10' in this case, the number of macroblocks of the macroblock data D11 decreases in proportion to the decrease of a number of pixels, and thus, a code amount of motion vectors to be generated decreases. That is, since the number of macroblocks decreases in proportion to the reduced number of pixels, an image part displayed by each macroblock increases (becomes rough in density). Thereby, a number of pixels necessary for representing a motion vector is lessened.

Accordingly, when a number of pixels is reduced, as the motion vectors of the original frame picture before reducing is larger, the ratio of reducing in the code amount of the motion vectors of the frame picture after pixel-converted becomes larger. Therefore, in the data encoding device 1, in the case where a picture largely changed, for instance, a scene is changed, the reduced code amount of the motion vector to be generated is allotted to a code amount of the DCT coefficient data D14 to be generated, so that encoding processing can be performed in a reduced quantization step size.

Since a picture greatly changes in a scene change, the data encoding device 1 reduces the number of pixels of the frame pictures after the scene change, allots the reduced code amount of motion vectors based on the decrease of the number of macroblocks to code amount of the DCT coefficient data D14, and performing encoding processing in a reduced quantization step size. Thereby, the coefficient values of the DCT coefficient data D14 can be increased, and the lowering of resolution in a DCT space can be prevented.

In this manner, the data encoding device 1 reduces the number of pixels of the picture data D10 at the timing of a scene change to reduce a quantization step size in proportion to that, and performing encoding processing. Thereby, a fixed-length coded data D21 in high image quality that can prevent the deterioration of image quality can be generated.

According to the above structure, since the data encoding device 1 encodes the pixel-converted picture data D10' synthesizing the timing of a scene change with the timing of reducing the number of pixels of the picture data D10, a frame size is not changed in the same scene but changed at the timing of the scene change. Therefore, the fixed-length coded data D21 in which unnatural feeling of view to the viewer accompanied by a change of frame size is eliminated can be generated.

Figure 17:
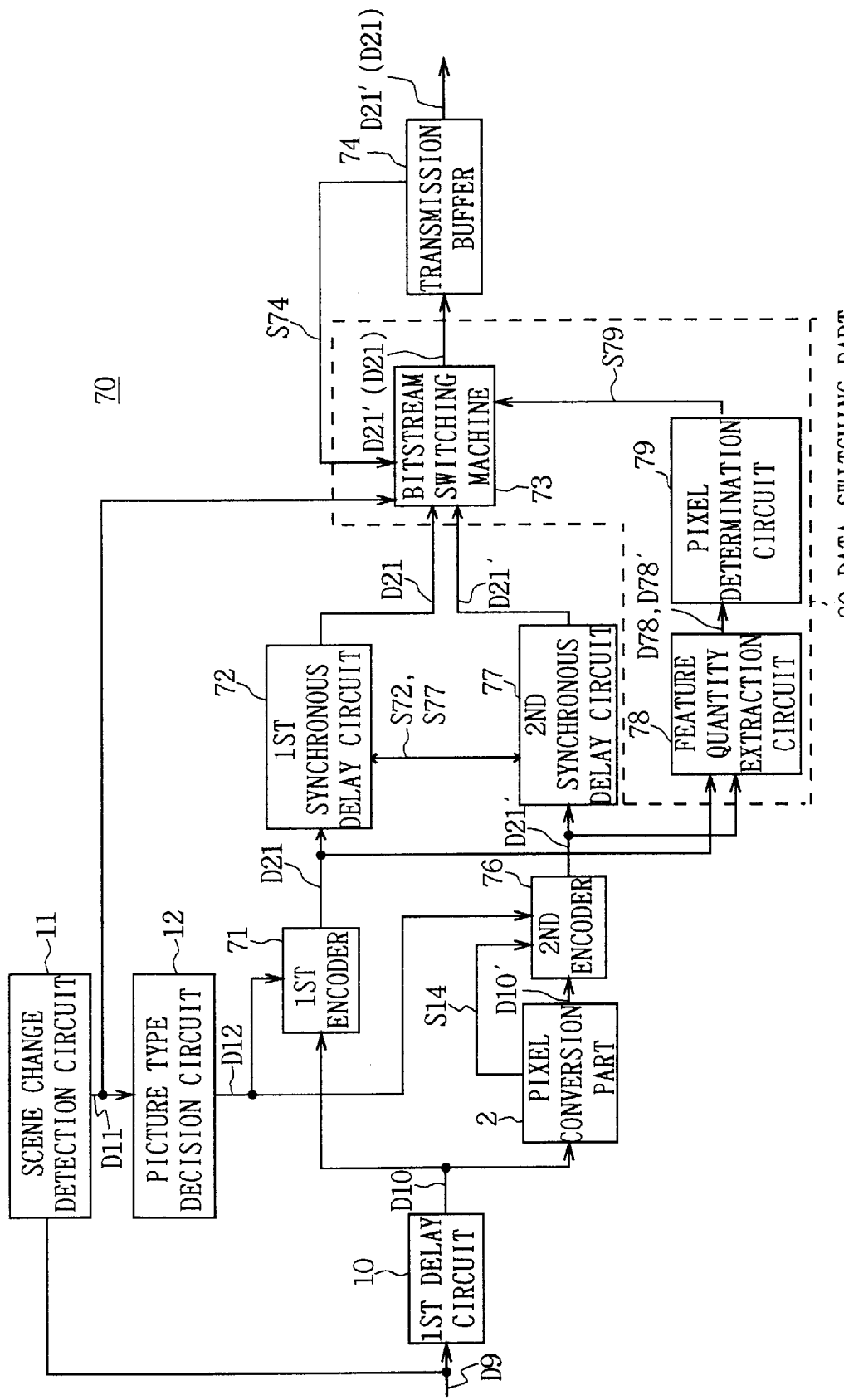
FIG. 17 is a block diagram showing the configuration of a data encoding device of the second embodiment according to the the present invention.

Referring to FIG. 17 in which the same reference numerals are added to corresponding part of FIG. 8, 70 generally shows a data encoding device of a second embodiment according to the present invention. Picture data D9 is transmitted to a first delay circuit 10 and a scene change detection circuit 11 individually.

The first delay circuit 10 delays the picture data D9 for the time of scene change detection by the scene change detection circuit 11, and transmits this to a pixel conversion part 2 and a first encoder 71 as the first encoding means individually as picture data D10.

The pixel conversion part 2 reduces the number of pixels of the picture data D10 in a prescribed conversion ratio, and transmits this to a second encoder 76 as pixel-converted picture data D10'.

Figure 18:
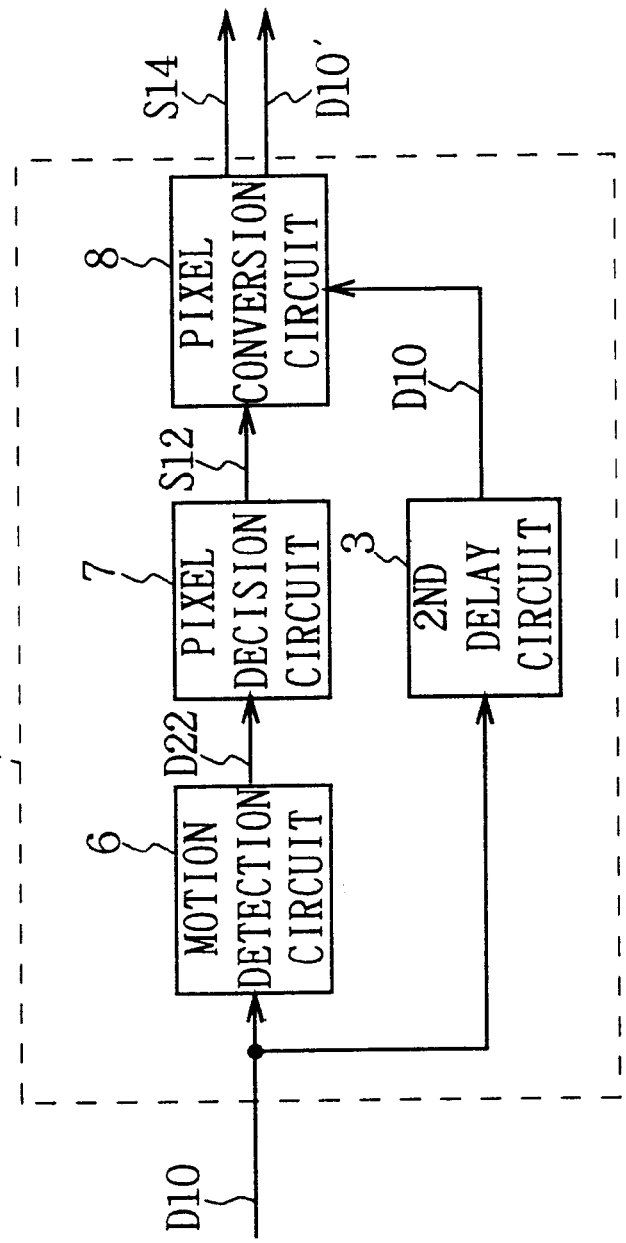
FIG. 18 is a block diagram showing the configuration of a pixel conversion part.

Here, as shown in FIG. 18 in which the same reference numerals are added to corresponding part of FIG. 8, the pixel conversion part 2 inputs the picture data D10 to a motion detection circuit 6 and a second delay circuit 3 individually. The motion detection circuit 6 divides the frame pictures of the picture data D10 into macroblocks composed of a brightness signal in 16 pixel×16 pixel and color difference signals ($C_B$, $C_R$) corresponding to the above brightness signal.

Then, the motion detection circuit 6 selects one reference block from among the plural divided macroblocks, and determines which one is the most similar to that from among many candidate blocks existing in a search area set in the previous frame picture, by calculating different values of brightness (hereinafter, this scheme is called as block matching method), and detects a positional shift with the most similar candidate block as a motion vector.

The motion detection circuit 6 executes the aforementioned motion vector detection processing on all macroblocks for each macroblock, and adds all of motion vectors detected in each macroblock, and calculating the absolute sum of the motion vectors for each frame, and transmits this to a pixel decision circuit 7 as motion vector data D22 representing the feature amount of a frame picture.

If the motion vector data D22, i.e., the absolute sum of the motion vectors exceeds a prescribed threshold value, the pixel decision circuit 7 can judge that the moving amount of the frame picture is large. In this case, since if the frame picture is encoded by the second encoder 76 as the second encoding means in the current number of pixels, the information amount increases too much, a quantization step size must be set again to a larger value. However, image quality unfortunately deteriorates accompanied with this.

In such case, the pixel decision circuit 7 judges that the number of pixels of frame pictures must be reduced, and transmits a conversion signal S12 to convert it into a preset number of pixels to a pixel conversion circuit 8.

The pixel conversion circuit 8 transmits the conversion signal S12 to convert a frame picture in M (1920) pixel×N (1080) pixel into a frame picture in m (1440) pixel×n (720) pixel to the pixel conversion circuit 8.

By the way, in the second delay circuit 3, the picture data D10 is outputted for each frame at the timing delayed for a time until when a change in a number of pixels is decided in the motion detection circuit 6 and the pixel decision circuit 7. Thereby, the conversion signal S12 is inputted from the pixel decision circuit 7 to the pixel conversion circuit 8 synchronizing with the timing where the picture data D10 is inputted to the pixel conversion circuit 8.

The pixel conversion circuit 8 converts the picture data D10 into m (1440) pixel×n (720) pixel preset according to the conversion signal S12, and transmits this to the second encoder 76 as pixel-converted picture data D10'.

In addition, immediately after converting a number of pixels into m (1440) pixel×n (720) pixel, the pixel conversion circuit 8 transmits a sequence end code which means the end of the present bitstream of a frame picture in M (1920) pixel×N (1080) pixel, and sequence header information to start a new bitstream after of that, to the preprocessing part (not shown in figure) of the second encoder 76 as a sequence control signal S14.

Thereby, in the second encoder 76, when the picture data D10' with GOPs that have been newly pixel-converted by the control of the preprocessing part according to the sequence control signal S14 is encoded, the encoding processing is performed without using frame pictures with GOPs before pixel-converted as reference pictures, but using frame pictures with GOPs after pixel-converted as reference pictures. Thus, in the second encoder 76, a malfunction that the frame pictures after pixel-converted are encoded using the frame pictures before pixel-converted as reference pictures can be prevented.

When the pixel conversion circuit 8 practically reduces a number of pixels, to convert M (1920) pixel before pixel-converted into m (1440) pixel, the conversion ratio is 3:2. The pixel conversion circuit 8 uprates to twice the M (1920) pixel, and then decimates into half for oversampling.

In thus pixel-converted picture data D10', since a number of macroblocks decreases in proportion to the decrease of the number of pixels, a code amount of motion vectors in encoding by the encoder 5 also decreases. Therefore, since a code amount of fixed-length coded data D21' to be outputted from the second encoder 76 is fixed, the reduced code amount of motion vectors accompanied with the reduced number of macroblocks can be allotted to a code amount of DCT coefficient data.

As a result, the second encoder 76 can quantize the DCT coefficient data D14 after pixel conversion in a more fine step than a quantizing step that had been done before pixel conversion. This increases coefficient values of the DCT coefficient data D14, so that the fixed-length coded data D21' which prevents the lowering of a resolution in a DCT space can be generated and outputted.

Since the configurations of the first encoder 71 and the second encoder 76 are the same as the configuration of the encoder 5 in the aforementioned first embodiment, they are omitted here.

The fixed-length coded data D21 outputted from the first encoder 71 and the fixed-length coded data D21' outputted from the second encoder 76 are transmitted to a first synchronous delay circuit 72 and a second synchronous delay circuit 77 respectively. The first synchronous delay circuit 72 and the second synchronous delay circuit 77 read the sequence header information that have been included in the fixed length coded data D21 and the fixed-length coded data D21' respectively, generate synchronizing signals S72 and S77 based on that, and mutually exchange them.

In this case, the first synchronous delay circuit 72 delays the fixed-length coded data D21 for the time of pixel conversion processing by the pixel conversion part 2 to synchronize a temporal timing of the synchronizing signals S72 and S77, and transmits the above fixed-length coded data D21 and the fixed-length coded data D21' respectively to a bitstream switching machine 73 in the state where they are synchronized.

By the way, the fixed-length coded data D21 and the fixed-length coded data D21' respectively outputted from the first encoder 71 and the second encoder 76 have been also supplied to a feature quantity extraction circuit 78 in a data switching part 80. The feature quantity extraction circuit 78 calculates a signal-to-noise ratio (S/N.) for each frame respectively according to the fixed-length coded data D21 and the fixed-length coded data D21', obtains the mean values of them respectively for each GOP, and transmits them to a pixel determination circuit 79 as quality state data D78 and D78'.

The pixel determination circuit 79 compares the quality state data D78 and D78', selects one with a better S/N. of the fixed-length coded data D21 and the fixed-length coded data D21', and transmits the selected result to the bitstream switching machine 73 as a switching signal S79.

The bitstream switching machine 73 selects one bitstream to be outputted of the fixed-length coded data D21 or the fixed-length coded data D21' based on the switching signal S79, and transmits the above selected bitstream of the fixed-length coded data D21 or the fixed-length coded data D21' to a transmission buffer 74.

Figure 19:
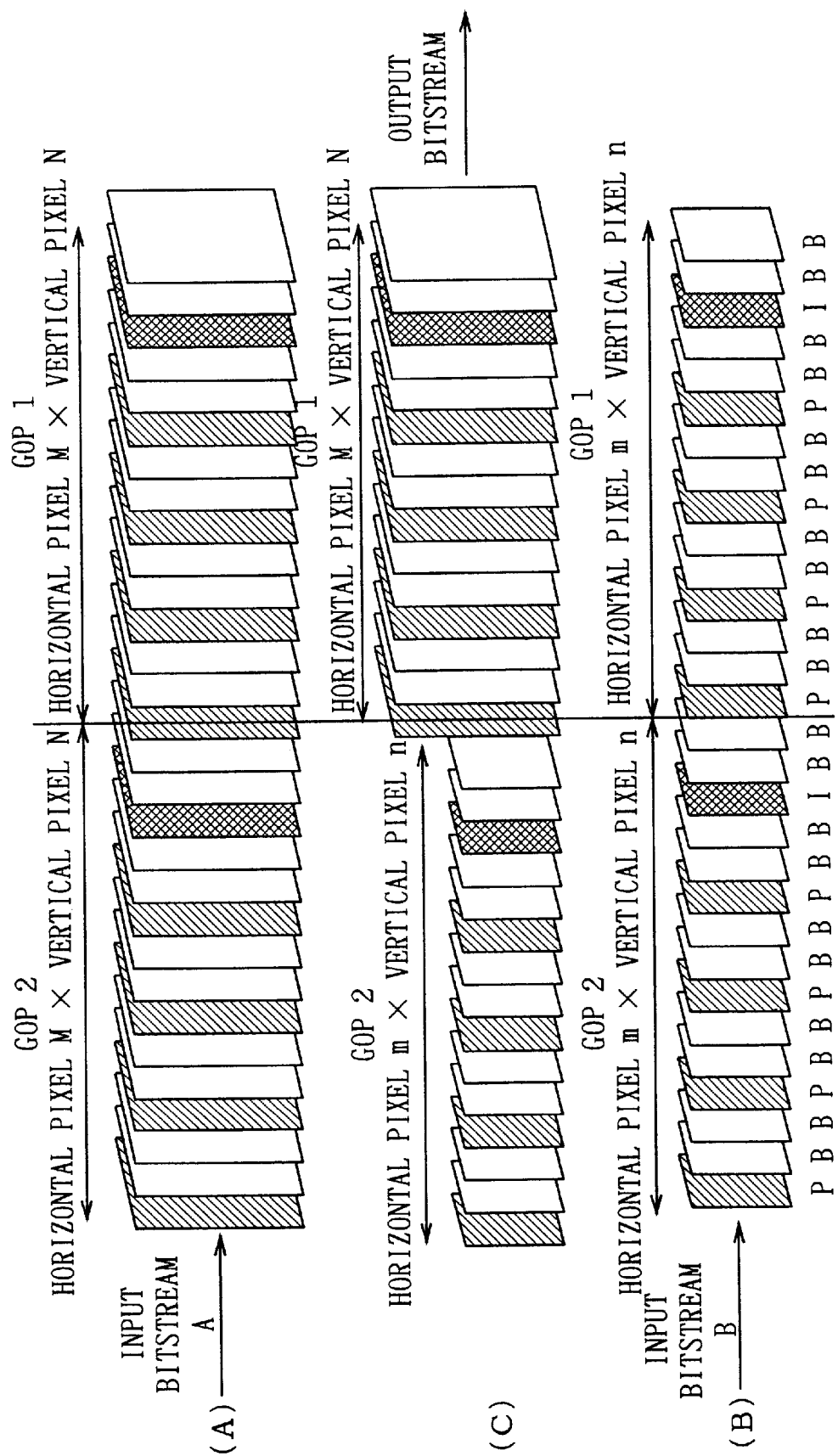
FIGS. 19A to 19C are schematic diagrams explaining the switch processing of bitstreams.

Here, as shown in FIGS. 19A and 19B, in the case where a bitstream A as the fixed-length coded data D21 and a bit stream B as the fixed-length coded data D21' are respectively inputted in the bitstream switching machine 73, if the switching signal S79 is supplied between the GOP 1 and the GOP 2, for instance, as shown in FIG. 19C, the bitstream switching machine 73 switches from the bitstream A of the fixed-length coded data D21 to the bitstream B of the fixed-length coded data D21' at the timing of switching from the GOP 1 to the GOP 2 and outputting it.

In this case, since the S/N. of the bitstream A was better than that of the bitstream B at a first stage, the bitstream switching machine 73 outputted the above bitstream A to the transmission buffer 74.

However, when the quality state data D78 and D78' extracted from the feature quantity extraction circuit 78 are compared, if the better S/N. of the pixel-converted bitstream B than that of the bitstream A is obtained, the pixel determination circuit 79 outputs the switching signal S79 to the bitstream switching machine 73. Thus, the bitstream switching machine 73 switches from the bitstream A to the bitstream B at the timing of switching from the GOP 1 to the GOP 2 based on the switching signal S79 and outputs it to the transmission buffer 74.

In this case, the bitstream switching machine 73 writes a sequence end code at the end of the GOP 1 when switching from the bitstream A to the bitstream B, ends the sequence of the bitstream A once, begins the sequence of the following bitstream B, and outputs the pixel-converted frame pictures of the GOP 2 to the transmission buffer 74.

The Transmission buffer 74 outputs the bitstream B of the fixed-length coded data D21' after stored once, and feeds back buffer occupancy rate information S74 at this time to the bitstream switching machine 73. Thereby, the bitstream switching machine 73 adjusts the fixed-length coded data D21' based on the occupancy rate information S74 so that a data occupancy rate in the transmission buffer 74 is fixed, and outputs it.

By the way, the pixel conversion part 2, if the motion vector data D22 (FIG. 18), i.e., the absolute sum of motion vectors exceeds a prescribed threshold value, then judges the moving amount of the frame picture is large and reduces the number of pixels. But if not, the pixel conversion part 2 outputs that to the second encoder 76 as it is as the picture data D10 without performing pixel conversion. Since the quality state data D78 and D78' outputted from the feature quantity extraction circuit 78 in this case have no difference, the bitstream switching machine 73 may only output the fixed-length coded data D21 to the transmission buffer 74 as it is.

On the other hand, a scene change detection circuit 11 calculates the absolute difference sum of brightness between two adjacent frame pictures based on the picture data D9. If the above absolute difference sum of brightness exceeds a prescribed threshold value, the scene change detection circuit 11 judges that a scene changes, and at this time, it transmits scene change detection data D11 to the bitstream switching machine 73 of the data switching part 73 and a picture type decision circuit 12 individually.

The bitstream switching machine 73 switches between the fixed-length coded data D21 and the fixed-length coded data D21' based on the switching signal S79 supplied from the pixel determination circuit 79, and transmits selected one to the transmission buffer 74. However, the bitstream switching machine 73 ignores the switching signal S79 until the scene change detection data D11 is supplied from the scene change detection circuit 11, and only if the scene change detection data S11 and the switching signal S79 coincide with each other in the same frame, it switches and outputs a bitstream.

When encoding the frame pictures of the GOP 3 after a scene change (FIG. 16) according to the scene change detection data D11, the picture type decision circuit 12 supplies specifying data D12 to specify a picture type so that a frame picture of the previous GOP 2 is not used as a reference frame to the preprocessing parts (not shown in figure) of the first encoder 71 and the second encoder 76 individually.

Thereby, when performing predictive coding on frame pictures after a scene change, the first encoder 71 and the second encoder 76 can perform predictive coding without using a frame picture before the scene change as a reference picture but using, for example, an I-picture in the GOP 3 after the scene change as a reference picture. Thus, the propagation of the deterioration of image quality can be prevented.

According to the above structure, the data encoding device 70 supplies the scene change detection data D11 to the data switching part 80 when a scene change is detected by the scene change detection circuit 11. At this time, in the data switching part 80, a bitstream with a better S/N. is selected in the bitstream switching machine 73 according to the quality state data D78 and D78'.

However, even if receiving a switching signal S79 to output the fixed-length coded data D21' that has been coded based on the pixel-converted picture data D10', the data switching part 80 outputs the fixed-length coded data D21 based on the picture data D10 until receiving the scene change detection data D11.

That is, in the data switching part 80, only if the switching signal S79 is supplied from the pixel determination circuit 79 and also the scene change detection data D11 is supplied from the scene change detection circuit 11 and they coincide with each other in the same frame, it is switched from the fixed-length coded data D21 to the fixed-length coded data D21' at the supplied timing of the above scene change detection data D11 and outputs it.

In this manner, in the data encoding device 70, if the fixed-length coded data D21' that has been coded based on the pixel-converted picture data D10 is outputted, it is outputted synchronizing with the timing of a scene change. Thereby, a frame size is changed when a scene changes without changing a frame size in the same scene. It makes a viewer hard to notice a change of image quality and unnatural feeling is eliminated, and it becomes easy to view very much.

Moreover, in the picture data D10' in this case, the number of macroblocks of the macro block data D11 decreases in proportion to the decrease of a number of pixels, and thus, a code amount of motion vectors to be generated decreases. That is, since the number of macroblocks decreases in proportion to the reduced number of pixels, an image part displayed by each macroblock increases (becomes rough). Thereby, a number of pixels necessary for representing a motion vector is lessened.

Accordingly, when a number of pixels is reduced, as the motion vectors of the original frame picture before reducing is larger, the ratio of reducing the code amount of the motion vectors of the frame picture after pixel-converted becomes larger. Therefore, in the data encoding device 70, in the case where a scene changed in that a picture largely moved, the reduced code amount of motion vectors is allotted to a code amount of DCT coefficient data to be generated, so that encoding processing can be performed in a reduced quantization step size.

Since a picture greatly changes when a scene changes, the data encoding device 70 reduces the number of pixels of the frame pictures after the scene change, allots the reduced code amount of motion vectors based on the decrease of the number of macroblocks to a code amount of DCT coefficient data, and performing encoding processing in a reduced quantization step size. Thereby, the coefficient values of the DCT coefficient data D14 can be increased, and the lowering of resolution in a DCT space can be prevented.

According to the above structure, the data encoding device 70 performing encoding processing to the picture data D10 or D10' different in a number of pixels in parallel respectively. And when one of them, with better image quality, is outputted in output step, if it is the fixed-length coded data D21' coded based on the pixel-converted picture data D10', the above fixed-length coded data D21' is outputted at the timing of a scene change. Therefore, unnatural feeling of view to the viewer accompanied by a change of frame size can be eliminated.

In the first and the second embodiments described above, it has dealt with the case of comparing the absolute sum of motion vectors with a prescribed threshold value in the motion detection circuit 6 as a method for detecting a moving amount of pictures. However, the present invention is not limited to this but also may compare the sum total of difference values of brightness of each pixel between the macroblocks of the present processing frame picture and the macroblock of a reference frame picture, i.e., the absolute difference sum of brightness values with the prescribed threshold value. In this case, if the absolute difference sum of brightness values exceeds the prescribed threshold value, this means that there is a large movement in a picture. Therefore, the pixel decision circuit 7 supplies at this time the conversion signal S13 to convert a number of pixels to the pixel conversion circuit 8.

In the first and the second embodiments described above, it has dealt with the case of comparing the vector data D22 representing the absolute sum of motion vectors with a prescribed threshold value in the motion detection circuit 6 as a method for detecting the moving amount of pictures. However, the present invention is not limited to this but also the absolute sum of the multiplied result that the absolute value of motion vectors is multiplied by the absolute difference sum of the brightness values detected for each macroblock as described above, may be used as motion vector D22. In this case, data accuracy of the motion vector D22 in pixel conversion can be further improved.

In the first and the second embodiments described above, it has dealt with the case of converting frame pictures in M (1920) pixel×N (1080) pixel into frame pictures in m (1440) pixel×n (720) pixel by the pixel conversion circuit 8. However, the present invention is not only limited to this but also that may be reduced in various number of pixels in a prescribed conversion ratio.

In the first and the second embodiments described above, it has dealt with the case where the number of pixels of the picture data D10 is not converted until the scene change detection data D11 is supplied from the scene change detection circuit 11 to the pixel conversion part 2. However, the present invention is not only limited to this but also even if the scene change detection data D11 is not supplied, the number of pixels may be converted at the timing where a time for processing the picture data for two GOPs passed from the time when the necessity of converting the number of pixels occurred, for instance. In this case, even if the scene change detection data D11 is not supplied, an output for a long time of the fixed-length coded data D21 deteriorated in image quality can be prevented when the number of pixels must be converted.

In the first and the second embodiments described above, it has dealt with the case where the pixel decision circuit 7 decides to change a number of pixels according to the absolute sum of motion vectors detected by the motion detection circuit 6. However, the present invention is not only limited to this but also that may decide to change the number of pixels by other various methods, for instance, a method for deciding to change the number of pixels based on a change rate of a color (e.g., red) between two adjacent frame pictures, a method for deciding to change the number of pixels based on the absolute difference sum of brightness of each pixel, etc.

In the first and the second embodiments described above, it has dealt with the case where, if the absolute difference sum of brightness values between adjacent frame pictures exceeds a prescribed threshold value, that a scene changes is judged in the scene change detection circuit 11. However, the present invention is not only limited to this but also a scene change may be detected by other various methods, for instance, a method for detecting a scene change based on an amount of change between the mean value of brightness of past several frames and the brightness value of the present frame picture, a method for detecting a scene change based on an amount of change of the mean value of, e.g., a color difference signal CR at every fixed time period with respect to chrominance between two frame pictures, etc.

In the first and the second embodiments described above, it has dealt with the case where, if the absolute difference sum of brightness values between adjacent frame pictures exceeds a prescribed threshold value, that a scene changes is judged and the scene change detection data D11 is outputted from the scene change detection circuit 11. However, the present invention is not only limited to this but also the scene change detection data D11 may be outputted when a scene changes to a commercial broadcasting by setting the threshold level higher.

In the first and the second embodiments described above, it has dealt with the case where the present invention is applied to the data encoding devices 1 and 70 for encoding data by an MPEG2 method. However, the present invention is not only limited to this but also it may be applied to the case where the fixed-length coded data D21 and D21' outputted from the transmission buffers 18 and 74 are transmitted after modulated by a prescribed modulation method.

In the second embodiment described above, it has dealt with the case where the fixed-length coded data D21' is not outputted until the scene change detection data D11 is supplied from the scene change detection circuit 11 to the bitstream switching machine 73. However, the present invention is not only limited to this but also, even if the scene change detection data D11 is not supplied, the fixed-length coded data D21' may be outputted at the timing where a time for processing the picture data for two GOPs passed from the time when the necessity of outputting the fixed-length coded data D21 occurred, for instance.

Furthermore, in the first and the second embodiments described above, it has dealt with the case where the present invention is applied to the data encoding devices 1 and 70 for encoding data by the MPEG2 method. However, the present invention is not only limited to this but also it may be applied to data encoding devices by other various coding methods.

According to the present invention as described above, by reducing a number of pixels at prescribed timings based on detected scene changes, a timing for reducing the number of pixels and a timing of a scene change can be, associated. Thus, high quality coded data in which the deterioration of image quality is prevented can be generated.

If the quality state of second coded data is better than first coded data and the above second coded data is selected, it is outputted at the prescribed timing based on scene changes, so that a timing for outputting the second coded data and the timing of scene changes can be associated. Thereby, high quality coded data in which unnatural feeling owing to a change of frame size is eliminated and the deterioration of image quality is prevented can be generated.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A data encoding device for encoding picture data comprising:

scene change detection means for detecting a scene change in picture data;

decision means for deciding whether a number of pixels in a picture in the picture data should be changed for controlling a code amount of an encoded bit stream generated per fixed period;

pixel conversion means for converting the number of pixels of the picture at a prescribed timing and outputting converted picture data, wherein the prescribed timing associated with the scene change detected by the scene change detection means, wherein the pixel conversion means reduces the number of pixels thereby giving rise to a surplus code amount; and encoding means for encoding said picture data and the converted picture data that uses a motion vector with the surplus code amount allocated to a feature quantity of the picture data.

2. The data encoding device according to claim 1, wherein said feature quantity is based on at least one of an absolute sum of the motion vectors of each block formed in a prescribed area between two adjacent frames, a ratio of a change of colors between two adjacent frames, and an absolute difference sum of brightness between two adjacent frames.

3. A method for encoding picture data, comprising the steps of:

detecting a scene change in picture data;

deciding whether a number of pixels in a picture in the picture data should be changed for controlling a code amount of an encoded bit stream generated per fixed period;

reducing the number of pixels of said picture at a prescribed timing and outputting converted picture data, wherein the prescribed timing is a scene change timing associated with the scene change detected and reducing the number of pixels gives rise to a surplus code amount; and encoding the converted picture data using a motion vector with the surplus code amount allocated to a feature quantity of the picture data.

4. The method for data encoding according to claim 3, wherein if said scene change has not been detected for a fixed time from the time when said feature quantity, calculated based on at least one of a ratio of a change of colors and an absolute difference sum of brightness between two adjacent frames, exceeded a prescribed threshold value and the necessity of reducing the number of pixels occurred, the number of pixels of said picture data is reduced in a prescribed conversion ratio at the timing after the prescribed time passed from the time when said necessity occurred.

5. A method for data transmission of encoded picture data comprising the steps of:

detecting a scene change in picture data;

deciding whether a number of pixels in a picture in the picture data should be changed for controlling a code amount of an encoded bit stream generated per fixed period;

reducing the number of pixels of said at a prescribed timing which gives rise to a surplus code amount and outputting converted picture data, wherein the prescribed timing is a scene change timing associated with the scene change detected; and encoding the converted picture data using a motion vector with the surplus code amount allocated to a feature quantity of the picture data; and transmitting the converted picture data after encoding.

6. The method for data transmission according to claim 5, wherein said feature quantity is calculated based on at lease one of an absolute sum of the motion vectors of each block formed in a prescribed area between two adjacent frames, a ratio of a change of color between the two adjacent frames, and an absolute difference sum of brightness between two adjacent frames.

7. A data encoding device for encoding picture data comprising:

scene change detection means for detecting a scene change in picture data;

decision means for deciding whether a number of pixels in a picture in the picture data should be changed for controlling a code amount of an encoded bit stream generated per fixed period;

first encoding means for encoding said picture data and generating first coded data;

pixel conversion means for converting the number of pixels of the picture to form converted picture data and reducing the number of pixels thereby giving rise to a surplus code amount;

second encoding means that uses a motion vector with the surplus code amount allocated to a feature quantity of the picture data for encoding the converted picture to generate second coded data; and data shift means for comparing first coded data image quality with second coded data image quality, and when said second coded data image quality is better, outputting the second coded data at a prescribed timing, wherein the prescribed timing is a scene change timing associated with the scene change detected by the scene change detection means.

8. The data encoding device according to claim 7, wherein said pixel conversion means calculates said feature quantity based on at least one of an absolute sum of the motion vectors of each block formed in a prescribed area between two adjacent frames, a ratio of change of colors between the two adjacent frames, and an absolute difference sum of brightness between the two adjacent frames.

9. A method for encoding picture data comprising the steps of:

detecting a scene change in picture data;

deciding whether a number of pixels in a picture in the picture data should be changed for controlling a code amount of an encoded bit stream generated per fixed period;

encoding said picture data without converting the number of pixels of said picture to generate the first coded data, and reducing the number of pixels of said picture data to form converted picture data that gives rise to a surplus code amount and encoding said converted picture data comprises using a motion vector with the surplus code amount allocated to a feature quantity of the picture data; and comparing first coded data image quality with second coded data image quality and when said second coded data image quality is better, outputting the second coded data at a prescribed timing, wherein the prescribed timing is a scene change timing associated with the scene change detected.

10. The method for data encoding according to claim 9, wherein said feature quantity is calculated based on at least one of an absolute sum of the motion vectors of each block formed in a prescribed area between two adjacent frames, a ratio of a change of colors between the two adjacent frames, and an absolute difference sum of brightness between the two adjacent frames.

11. A method for data transmission comprising the steps of:

detecting a scene change in picture data;

deciding whether a number of pixels in a picture in the picture data should be changed for controlling a code amount of an encoded bit stream generated per fixed period;

encoding said picture data without converting the number of pixels of said picture to generate the first coded data, and reducing the number of pixels of said picture data to form converted picture data gives rise to a surplus code amount and encoding said converted picture data comprises using a motion vector with the surplus code amount allocated to a feature quantity of the picture data;

comparing first coded data image quality with second coded data image quality and when said second coded data image quality is better, outputting the second coded data at a prescribed timing, wherein the prescribed timing is a scene change timing associated with the scene change detected; and transmitting the second coded data.

12. The method for data transmission according to claim 11, wherein said feature quantity is calculated based on at least one of an absolute sum of the motion vectors of each block formed in a prescribed area between the two adjacent frames, an absolute sum of the motion vectors of each block formed in a prescribed area between two adjacent frames, and a ratio of a change of colors between the two adjacent frames.

* * * * *